US010531452B2

(12) United States Patent
Sun et al.

(10) Patent No.: US 10,531,452 B2
(45) Date of Patent: Jan. 7, 2020

(54) HYBRID AUTOMATIC REPEAT REQUEST FEEDBACK AND MULTIPLE TRANSMISSION TIME INTERVAL SCHEDULING

(71) Applicant: QUALCOMM Incorporated, San Diego, CA (US)

(72) Inventors: Jing Sun, San Diego, CA (US); Taesang Yoo, Riverside, CA (US); Aleksandar Damnjanovic, Del Mar, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 15/585,027

(22) Filed: May 2, 2017

(65) Prior Publication Data
US 2018/0014298 A1 Jan. 11, 2018

Related U.S. Application Data

(60) Provisional application No. 62/360,774, filed on Jul. 11, 2016.

(51) Int. Cl.
*H04W 72/04* (2009.01)
*H04L 1/16* (2006.01)
(Continued)

(52) U.S. Cl.
CPC ....... *H04W 72/0446* (2013.01); *H04L 1/1614* (2013.01); *H04L 1/189* (2013.01);
(Continued)

(58) Field of Classification Search
CPC ............. H04W 72/0446; H04W 72/14; H04W 72/042; H04W 72/0413; H04L 1/1812;
(Continued)

(56) References Cited

U.S. PATENT DOCUMENTS

2008/0059859 A1* 3/2008 Marinier ............... H04L 1/1812
714/748
2014/0146742 A1* 5/2014 Khandekar .......... H04B 1/7073
370/328
(Continued)

OTHER PUBLICATIONS

ISA/EP, International Search Report and Written Opinion of the International Searching Authority, Int'l Application No. PCT/US2017/041296, dated Oct. 2, 2017, European Patent Office, Rijswijk, NL, 13 pgs.
(Continued)

*Primary Examiner* — Moo Jeong
(74) *Attorney, Agent, or Firm* — Holland & Hart LLP

(57) ABSTRACT

Methods, systems, and devices for wireless communication are described. A mobile device may be scheduled for resources of multiple transmission time intervals (TTIs) with a downlink control message; some or all of the multiple TTIs may be associated with different hybrid automatic repeat request (HARQ) processes. Each TTI may include data mapped to one transport block (TB), and each TB may be associated with a separate HARQ process. The downlink control message may include an indication of which HARQ processes are associated with resources of the multiple TTIs scheduled by the message. For example, the downlink control message may include a mapping (e.g., a bitmap) that indicates a relationship between each HARQ process and each TTI scheduled by the message. Feedback for TBs of some TTIs may differ, and an acknowledgment of receipt or successful decoding may depend on timing of TTIs in relation to a control message.

29 Claims, 23 Drawing Sheets

(51) Int. Cl.
    *H04L 1/18*     (2006.01)
    *H04W 72/14*    (2009.01)
    *H04L 5/00*     (2006.01)

(52) U.S. Cl.
    CPC .......... *H04L 1/1812* (2013.01); *H04L 1/1822* (2013.01); *H04L 1/1825* (2013.01); *H04L 1/1854* (2013.01); *H04L 1/1887* (2013.01); *H04W 72/042* (2013.01); *H04W 72/0413* (2013.01); *H04W 72/14* (2013.01); *H04L 5/0055* (2013.01)

(58) Field of Classification Search
    CPC ... H04L 5/0055; H04L 1/1614; H04L 1/1854; H04L 1/189; H04L 1/1822; H04L 1/1825; H04L 1/1887
    See application file for complete search history.

(56) References Cited

U.S. PATENT DOCUMENTS

| | | | |
|---|---|---|---|
| 2016/0157213 A1* | 6/2016 | Takeda | H04L 1/1822 370/329 |
| 2017/0099664 A1* | 4/2017 | Lunttila | H04W 72/0446 |
| 2017/0105036 A1* | 4/2017 | Viveganandhan | H04N 21/2747 |

OTHER PUBLICATIONS

Mediatek, "Multi-TTI Scheduling," 3GPP TSG RAN WG1 Meeting #84bis, R1-163830, Busan, Korea, Apr. 11-15, 2016, 4 pgs., 3rd Generation Partnership Project.

\* cited by examiner

HYBRID AUTOMATIC REPEAT REQUEST FEEDBACK AND MULTIPLE TRANSMISSION TIME INTERVAL SCHEDULING

CROSS REFERENCES

The present Application for Patent claims priority to U.S. Provisional Patent Application No. 62/360,774 by SUN, et al., entitled "HYBRID AUTOMATIC REPEAT REQUEST FEEDBACK AND MULTIPLE TRANSMISSION TIME INTERVAL SCHEDULING," filed Jul. 11, 2016, assigned to the assignee hereof.

BACKGROUND

The following relates generally to wireless communication and more specifically to hybrid automatic repeat request (HARQ) feedback and multiple transmission time interval (TTI) scheduling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

A wireless multiple-access communications system may include a number of base stations, each simultaneously supporting communication for multiple communication devices, which may be otherwise known as user equipment (UE). A base station may communicate with UEs on downlink channels (e.g., for transmissions from a base station to a UE) and uplink channels (e.g., for transmissions from a UE to a base station). In some examples, UEs and base stations may use wireless resources from a shared radio frequency spectrum band for downlink or uplink communications, or both.

A base station may transmit a downlink control message to a UE that indicates resource information for a group of transmission time intervals (TTIs) that are allocated by the control message. Error correction schemes may be employed to avoid miscommunications or decoding failures for the group of TTIs. But without some level of granularity in the error correction scheme, feedback for the group of TTIs may be high in overhead or may result in unnecessarily large retransmissions of data.

SUMMARY

The described techniques relate to methods, systems, devices, and apparatuses that support hybrid automatic repeat request (HARQ) feedback for multiple transmission time interval (TTI) scheduling. A mobile device may be scheduled for resources of multiple TTIs with a downlink control message. Some or all of the multiple TTIs may be associated with different HARQ processes. Each TTI may include data mapped to one transport block (TB), which, in turn, may be associated with a HARQ process. The downlink control message may include an indication of which HARQ processes are associated with resources of the multiple TTIs scheduled by the message. Types of feedback for TBs of some TTIs may be different and may depend on a timing relationship between a TTI and the control message scheduling the TTI. For example, an acknowledgment of receipt or successful decoding may depend on timing of TTIs in relation to a control message.

A method for wireless communication is described. The method may include receiving a first downlink control message that includes a first grant for resources for a first plurality of TTIs, where at least two TTIs of the first plurality of TTIs is associated with different HARQ processes, identifying in the first downlink control message a plurality of HARQ process identifiers associated with the first plurality of TTIs, and communicating using the resources of at least one TTI of the first plurality of TTIs according to the HARQ process for the at least one TTI and based at least in part on the HARQ process identifier of the HARQ process of the at least one TTI.

An apparatus for wireless communication is described. The apparatus may include means for receiving a first downlink control message that includes a first grant for resources for a first plurality of TTIs, where at least two TTIs of the first plurality of TTIs are associated with different HARQ processes, means for identifying in the first downlink control message a plurality of HARQ process identifiers associated with the first plurality of TTIs, and means for communicating using the resources of at least one TTI of the first plurality of TTIs according to the HARQ process for the at least one TTI and based at least in part on the HARQ process identifier of the HARQ process of the at least one TTI.

Another apparatus for wireless communication is described. The apparatus may include a processor, memory in electronic communication with the processor, and instructions stored in the memory. The instructions may be operable to cause the apparatus to receive a first downlink control message that includes a first grant for resources for a first plurality of TTIs, where at least two TTIs of the first plurality of TTIs are associated with different HARQ processes, identify in the first downlink control message a plurality of HARQ process identifiers associated with the first plurality of TTIs, and communicate using the resources of at least one TTI of the first plurality of TTIs according to the HARQ process for the at least one TTI and based at least in part on the HARQ process identifier of the HARQ process of the at least one TTI.

A non-transitory computer readable medium for wireless communication is described. The non-transitory computer-readable medium may include instructions operable to cause a processor to receive a first downlink control message that includes a first grant for resources for a first plurality of TTIs, where at least two TTIs of the first plurality of TTIs are associated with different HARQ processes, identify in the first downlink control message a plurality of HARQ process identifiers associated with the first plurality of TTIs, and communicate using the resources of at least one TTI of the first plurality of TTIs according to the HARQ process for the at least one TTI and based at least in part on the HARQ process identifier of the HARQ process of the at least one TTI.

In some examples of the method, apparatus, and non-transitory computer-readable medium described above, each TTI of the TTIs of the first plurality of TTIs may be associated with a different HARQ process identifier. In some examples of the method, apparatus, and non-transitory computer-readable medium described above, identifying the plurality of HARQ process identifiers associated with the first plurality of TTIs includes identifying a bitmap indicative of the plurality of HARQ process identifiers associated with the first plurality of TTIs. In some examples of the method, apparatus, and non-transitory computer-readable medium described above, the bitmap includes a first value at each bit location that corresponds to each HARQ process identifier of the plurality of HARQ process identifiers associated with the first plurality of TTIs, and the bitmap includes a second value at each bit location that corresponds to HARQ process identifiers that may be unassociated with the first plurality of TTIs.

Some examples of the method, apparatus, and non-transitory computer-readable medium described above may further include processes, features, means, or instructions for determining a total number of the first plurality of TTIs based at least in part on a total number of occurrences of the first value included in the bitmap. Some examples of the method, apparatus, and non-transitory computer-readable medium described above may further include processes, features, means, or instructions for identifying in the first downlink control message one or more system configurations associated with the first plurality of TTIs, where the one or more system configurations apply to each TTI of the first plurality of TTIs.

In some examples of the method, apparatus, and non-transitory computer-readable medium described above, the one or more system configurations associated with the first plurality of TTIs include a modulation and coding scheme (MCS), a rank, a resource block (RB) allocation, or any combination thereof. Some examples of the method, apparatus, and non-transitory computer-readable medium described above may further include processes, features, means, or instructions for identifying in the first downlink control message a new data identifier (NDI) associated with the first plurality of TTIs. Some examples of the method, apparatus, and non-transitory computer-readable medium described above may further include processes, features, means, or instructions for identifying the NDI associated with the first plurality of TTIs by decoding an NDI bitmap.

In some examples of the method, apparatus, and non-transitory computer-readable medium described above, the NDI bitmap includes a length that may be equal to a total number of the first plurality of TTIs. In some examples of the method, apparatus, and non-transitory computer-readable medium described above, the NDI bitmap includes a length that may be based at least in part on a maximum transmission opportunity of a data burst associated with the first plurality of TTIs. In some examples of the method, apparatus, and non-transitory computer-readable medium described above, the NDI bitmap includes a length that may be equal to a length of a bitmap indicative of the plurality of HARQ process identifiers associated with the first plurality of TTIs.

Some examples of the method, apparatus, and non-transitory computer-readable medium described above may further include processes, features, means, or instructions for determining a transmission order for the plurality of HARQ process identifiers. Some examples of the method, apparatus, and non-transitory computer-readable medium described above may further include processes, features, means, or instructions for ordering the plurality of HARQ process identifiers in numerically ascending order, numerically descending order, or any other deterministic order. Some examples of the method, apparatus, and non-transitory computer-readable medium described above may further include processes, features, means, or instructions for ordering HARQ process identifiers associated with new data transmissions before HARQ process identifiers associated with retransmissions. Some examples of the method, apparatus, and non-transitory computer-readable medium described above may further include processes, features, means, or instructions for ordering HARQ process identifiers associated with new data transmissions after HARQ process identifiers associated with retransmissions.

Some examples of the method, apparatus, and non-transitory computer-readable medium described above may further include processes, features, means, or instructions for receiving a second downlink control message subsequent to the first plurality of TTIs, the second downlink control message including a second grant for resources for a second plurality of TTIs. Some examples of the method, apparatus, and non-transitory computer-readable medium described above may further include processes, features, means, or instructions for identifying in the second downlink control message a plurality of HARQ process identifiers associated with the second plurality of TTIs.

In some examples of the method, apparatus, and non-transitory computer-readable medium described above, the plurality of HARQ process identifiers associated with the second plurality of TTIs may be different from the plurality of HARQ process identifiers associated with the first plurality of TTIs. In some examples of the method, apparatus, and non-transitory computer-readable medium described above, the plurality of HARQ process identifiers associated with the second plurality of TTIs may be the same as the plurality of HARQ process identifiers associated with the first plurality of TTIs.

Some examples of the method, apparatus, and non-transitory computer-readable medium described above may further include processes, features, means, or instructions for identifying in the second downlink control message one or more system configurations associated with the second plurality of TTIs, where the one or more system configurations associated with the second plurality of TTIs apply to each TTI of the second plurality of TTIs, and where at least one of the one or more system configurations associated with the second plurality of TTIs may be different from at least one of the one or more system configurations associated with the first plurality of TTIs. In some examples of the method, apparatus, and non-transitory computer-readable medium described above, the one or more system configurations associated with the first plurality of TTIs and the one or more system configurations associated with the second plurality of TTIs include at least one of an MCS, a rank, an RB allocation, or any combination thereof.

Some examples of the method, apparatus, and non-transitory computer-readable medium described above may further include processes, features, means, or instructions for receiving a second downlink control message in one of the first plurality of TTIs, where the second downlink control message may be a retransmission of the first downlink control message. Some examples of the method, apparatus, and non-transitory computer-readable medium described above may further include processes, features, means, or instructions for decoding from the second downlink control message a bitmap that identifies a subset of the plurality of HARQ process identifiers that may be associated with the TTI that the second downlink control message was received in and subsequent TTIs of the first plurality of TTIs.

Some examples of the method, apparatus, and non-transitory computer-readable medium described above may further include processes, features, means, or instructions for identifying in the first downlink control message one or more system configurations associated with the first plurality of TTIs. Some examples of the method, apparatus, and non-transitory computer-readable medium described above may further include processes, features, means, or instructions for identifying in the second downlink control message one or more system configurations associated with the first plurality of TTIs, where the one or more system configurations identified in the first downlink control message may be the same as the one or more system configurations identified in the second downlink control message. Some examples of the method, apparatus, and non-transitory computer-readable medium described above may further include processes, features, means, or instructions for receiving a second downlink control message in one of the first plurality of TTIs, where the second downlink control message at least partially overwrites the first downlink control message.

Some examples of the method, apparatus, and non-transitory computer-readable medium described above may further include processes, features, means, or instructions for identifying in the first downlink control message one or more system configurations associated with the first plurality of TTIs. Some examples of the method, apparatus, and non-transitory computer-readable medium described above may further include processes, features, means, or instructions for identifying in the second downlink control message one or more system configurations associated with the first plurality of TTIs, where at least one of the one or more system configurations identified in the first downlink control message may be different than at least one of the one or more system configurations identified in the second downlink control message. In some examples of the method, apparatus, and non-transitory computer-readable medium described above, the first grant for resources includes an assignment of uplink resources.

Some examples of the method, apparatus, and non-transitory computer-readable medium described above may further include processes, features, means, or instructions for performing a clear channel assessment (CCA). Some examples of the method, apparatus, and non-transitory computer-readable medium described above may further include processes, features, means, or instructions for encoding data for transmission on the uplink resources. Some examples of the method, apparatus, and non-transitory computer-readable medium described above may further include processes, features, means, or instructions for transmitting a portion of the data on the uplink resources, where the portion of the data transmitted on the uplink resources may be based at least in part on a duration of a delay associated with the CCA.

A method for wireless communication is described. The method may include receiving a first downlink control message that includes a first grant for resources for a first plurality of TTIs, where at least two TTIs of the first plurality of TTIs are associated with different HARQ processes, identifying a subset of the first plurality of TTIs that are within a predetermined number of TTIs from the end of a data burst associated with the first plurality of TTIs, and transmitting a first acknowledgement (ACK) message associated with at least one of the TTIs of the subset of TTIs, where the first ACK message indicates that the HARQ processes associated with the at least one TTI of the subset of TTIs was received and not yet decoded.

An apparatus for wireless communication is described. The apparatus may include means for receiving a first downlink control message that includes a first grant for resources for a first plurality of TTIs, where at least two TTIs of the first plurality of TTIs are associated with different HARQ processes, means for identifying a subset of the first plurality of TTIs that are within a predetermined number of TTIs from the end of a data burst associated with the first plurality of TTIs, and means for transmitting a first ACK message associated with at least one of the TTIs of the subset of TTIs, where the first ACK message indicates that the HARQ processes associated with the at least one TTI of the subset of TTIs was received and not yet decoded.

Another apparatus for wireless communication is described. The apparatus may include a processor, memory in electronic communication with the processor, and instructions stored in the memory. The instructions may be operable to cause the apparatus to receive a first downlink control message that includes a first grant for resources for a first plurality of TTIs, where at least two TTIs of the first plurality of TTIs are associated with different HARQ processes, identify a subset of the first plurality of TTIs that are within a predetermined number of TTIs from the end of a data burst associated with the first plurality of TTIs, and transmit a first ACK message associated with at least one of the TTIs of the subset of TTIs, where the first ACK message indicates that the HARQ processes associated with the at least one TTI of the subset of TTIs was received and not yet decoded.

A non-transitory computer readable medium for wireless communication is described. The non-transitory computer-readable medium may include instructions operable to cause a processor to receive a first downlink control message that includes a first grant for resources for a first plurality of TTIs, where at least two TTIs of the first plurality of TTIs are associated with different HARQ processes, identify a subset of the first plurality of TTIs that are within a predetermined number of TTIs from the end of a data burst associated with the first plurality of TTIs, and transmit a first ACK message associated with at least one of the TTIs of the subset of TTIs, where the first ACK message indicates that the HARQ processes associated with the at least one TTI of the subset of TTIs was received and not yet decoded.

Some examples of the method, apparatus, and non-transitory computer-readable medium described above may further include processes, features, means, or instructions for transmitting a second ACK message associated with the at least one of the TTIs that was associated with the first ACK message, where the second ACK message indicates that the HARQ processes associated with the at least one TTI of the subset of TTIs was successfully decoded. Some examples of the method, apparatus, and non-transitory computer-readable medium described above may further include processes, features, means, or instructions for transmitting a second ACK message associated with the at least one of the TTIs that was associated with the first ACK message, where the second ACK message indicates that the HARQ processes associated with the at least one TTI of the subset of TTIs was not successfully decoded.

A method for wireless communication is described. The method may include transmitting a first downlink control message that includes a first grant for resources for a first plurality of TTIs, where at least two TTIs of the first plurality of TTIs are associated with different HARQ processes, indicating in the first downlink control message a plurality of HARQ process identifiers associated with the first plurality of TTIs, and communicating using the resources of at least one TTI of the first plurality of TTIs according to the HARQ process for the at least one TTI and based at least in part on the HARQ process identifier of the HARQ process of the at least one TTI.

An apparatus for wireless communication is described. The apparatus may include means for transmitting a first downlink control message that includes a first grant for resources for a first plurality of TTIs, where at least two TTIs of the first plurality of TTIs are associated with different HARQ processes, means for indicating in the first downlink control message a plurality of HARQ process identifiers associated with the first plurality of TTIs, and means for communicating using the resources of at least one TTI of the first plurality of TTIs according to the HARQ process for the at least one TTI and based at least in part on the HARQ process identifier of the HARQ process of the at least one TTI.

Another apparatus for wireless communication is described. The apparatus may include a processor, memory in electronic communication with the processor, and instructions stored in the memory. The instructions may be operable to cause the apparatus to transmit a first downlink control message that includes a first grant for resources for a first plurality of TTIs, where at least two TTIs of the first plurality of TTIs are associated with different HARQ processes, indicate in the first downlink control message a plurality of HARQ process identifiers associated with the first plurality of TTIs, and communicate using the resources of at least one TTI of the first plurality of TTIs according to the HARQ process for the at least one TTI and based at least in part on the HARQ process identifier of the HARQ process of the at least one TTI.

A non-transitory computer readable medium for wireless communication is described. The non-transitory computer-readable medium may include instructions operable to cause a processor to transmit a first downlink control message that includes a first grant for resources for a first plurality of TTIs, where at least two TTIs of the first plurality of TTIs are associated with different HARQ processes, indicate in the first downlink control message a plurality of HARQ process identifiers associated with the first plurality of TTIs, and communicate using the resources of at least one TTI of the first plurality of TTIs according to the HARQ process for the at least one TTI and based at least in part on the HARQ process identifier of the HARQ process of the at least one TTI.

In some examples of the method, apparatus, and non-transitory computer-readable medium described above, each TTI of the TTIs of the first plurality of TTIs may be associated with a different HARQ process identifier. In some examples of the method, apparatus, and non-transitory computer-readable medium described above, indicating the plurality of HARQ process identifiers associated with the first plurality of TTIs includes transmitting a bitmap indicative of the plurality of HARQ process identifiers associated with the first plurality of TTIs. In some examples of the method, apparatus, and non-transitory computer-readable medium described above, the bitmap includes a first value at each bit location that corresponds to each HARQ process identifier of the plurality of HARQ process identifiers associated with the first plurality of TTIs, and the bitmap includes a second value at each bit location that corresponds to HARQ process identifiers that may be unassociated with the first plurality of TTIs.

Some examples of the method, apparatus, and non-transitory computer-readable medium described above may further include processes, features, means, or instructions for transmitting a second downlink control message subsequent to the first plurality of TTIs, the second downlink control message including a second grant for resources for a second plurality of TTIs. Some examples of the method, apparatus, and non-transitory computer-readable medium described above may further include processes, features, means, or instructions for indicating in the second downlink control message a plurality of HARQ process identifiers associated with the second plurality of TTIs.

Some examples of the method, apparatus, and non-transitory computer-readable medium described above may further include processes, features, means, or instructions for indicating in the second downlink control message one or more system configurations associated with the second plurality of TTIs, where the one or more system configurations associated with the second plurality of TTIs apply to each TTI of the second plurality of TTIs, and where at least one of the one or more system configurations associated with the second plurality of TTIs may be different from at least one of the one or more system configurations associated with the first plurality of TTIs.

Some examples of the method, apparatus, and non-transitory computer-readable medium described above may further include processes, features, means, or instructions for transmitting a second downlink control message in one of the first plurality of TTIs, where the second downlink control message may be a retransmission of the first downlink control message. Some examples of the method, apparatus, and non-transitory computer-readable medium described above may further include processes, features, means, or instructions for transmitting a second downlink control message in one of the first plurality of TTIs, where the second downlink control message at least partially overwrites the first downlink control message. Some examples of the method, apparatus, and non-transitory computer-readable medium described above may further include processes, features, means, or instructions for identifying a subset of the first plurality of TTIs that may be within a predetermined number of TTIs from the end of a data burst associated with the first plurality of TTIs.

A method for wireless communication is described. The method may include transmitting a first downlink control message that includes a first grant for resources for a first plurality of TTIs, where at least two TTIs of the first plurality of TTIs are associated with different HARQ processes, identifying a subset of the first plurality of TTIs that are within a predetermined number of TTIs from the end of a data burst associated with the first plurality of TTIs, and receiving a first ACK message associated with at least one of the TTIs of the subset of TTIs, where the first ACK message indicates that the HARQ processes associated with the at least one TTI of the subset of TTIs was received and not yet decoded.

An apparatus for wireless communication is described. The apparatus may include means for transmitting a first downlink control message that includes a first grant for resources for a first plurality of TTIs, where at least two TTIs of the first plurality of TTIs are associated with different HARQ processes, means for identifying a subset of the first plurality of TTIs that are within a predetermined number of TTIs from the end of a data burst associated with the first plurality of TTIs, and means for receiving a first ACK message associated with at least one of the TTIs of the subset of TTIs, where the first ACK message indicates that the HARQ processes associated with the at least one TTI of the subset of TTIs was received and not yet decoded.

Another apparatus for wireless communication is described. The apparatus may include a processor, memory in electronic communication with the processor, and instructions stored in the memory. The instructions may be operable to cause the apparatus to transmit a first downlink control message that includes a first grant for resources for a first plurality of TTIs, where at least two TTIs of the first plurality of TTIs are associated with different HARQ processes, identify a subset of the first plurality of TTIs that are within a predetermined number of TTIs from the end of a data burst associated with the first plurality of TTIs, and receive a first ACK message associated with at least one of the TTIs of the subset of TTIs, where the first ACK message indicates that the HARQ processes associated with the at least one TTI of the subset of TTIs was received and not yet decoded.

A non-transitory computer readable medium for wireless communication is described. The non-transitory computer-readable medium may include instructions operable to cause a processor to transmit a first downlink control message that includes a first grant for resources for a first plurality of TTIs, where at least two TTIs of the first plurality of TTIs are associated with different HARQ processes, identify a subset of the first plurality of TTIs that are within a predetermined number of TTIs from the end of a data burst associated with the first plurality of TTIs, and receive a first ACK message associated with at least one of the TTIs of the subset of TTIs, where the first ACK message indicates that the HARQ processes associated with the at least one TTI of the subset of TTIs was received and not yet decoded.

Some examples of the method, apparatus, and non-transitory computer-readable medium described above may further include processes, features, means, or instructions for receiving a second ACK message associated with the at least one of the TTIs that was associated with the first ACK message, where the second ACK message indicates that the data associated with the HARQ process identifier associated with the at least one TTI was successfully decoded.

DETAILED DESCRIPTION

Figure 1:
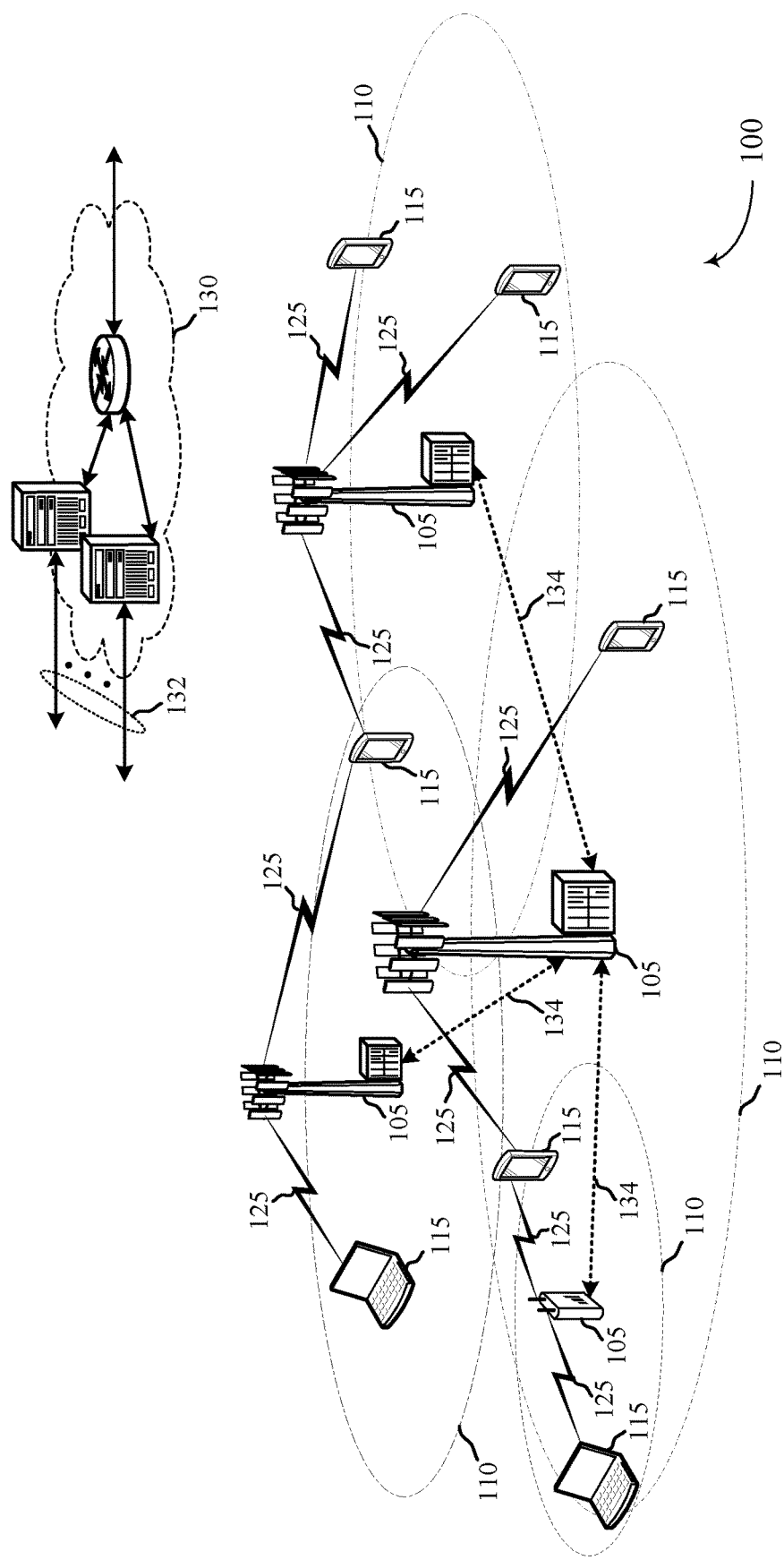
FIG. 1 illustrates an example of a wireless communications system that supports hybrid automatic repeat request (HARQ) feedback and multiple transmission time interval (TTI) scheduling in accordance with various aspects of the present disclosure.

A mobile device may be scheduled for resources of multiple transmission time intervals (TTIs) with a downlink control message, and some or all of the multiple TTIs may be associated with different hybrid automatic repeat request (HARQ) processes. For example, each TTI may include data mapped to one transport block (TB), and each TB may be associated with a separate HARQ process. The downlink control message may include an indication of which HARQ processes are associated with resources of the multiple TTIs scheduled by the message. This may provide for an error correction scheme with sufficient granularity to avoid some of the signaling overhead otherwise associated with feedback, or it may avoid unnecessarily large retransmissions of data, or both, which may improve system efficiency over error correction schemes involving common feedback or HARQ processes for several TTIs.

By way of example, in some systems, a base station may transmit a downlink control message to a user equipment (UE) that indicates resource information for a group of TTIs that are allocated by the control message. The control information for one or more of the TTIs within the TTI group may not be properly decoded by the UE, which may result in retransmission of the entire TTI group. It may be advantageous to dynamically modify control information for a TTI group without having to restart the transmission. So flexible approaches to scheduling and updating control information within TTI groups corresponding to a multi-TTI control message may improve performance in a wireless network. In addition, improved acknowledgment messaging for TTI groups may be desirable to accommodate the acknowledgment of certain data near the end of a data burst.

To effect these advantages, a base station may transmit control information for downlink or uplink communications to a UE in a downlink control message. The downlink control message may include control information for a group of TTIs that are assigned by the base station to the UE for uplink communications (e.g., uplink grant) or downlink communications (e.g., downlink grant). An uplink or downlink grant for multiple TTIs (e.g., multi-TTI grant) may, for example, include information related to the error correction procedures (e.g., HARQ processes) scheduled for the multiple TTIs included in the multi-TTI grant. In some cases, each TTI associated with the multi-TTI grant includes a separate HARQ process that differs from the HARQ processes associated with the other TTIs covered by the grant.

In some examples, a base station may transmit several multi-TTI grants over the course of a data burst. For downlink communications, the base station may transmit several non-overlapping multi-TTI grants, and may change one or more system configurations (e.g., a modulation and coding scheme (MCS), a resource block (RB) allocation, rank) from one grant to the next. Also, a base station may transmit a first multi-TTI grant and then may retransmit the same multi-TTI grant during a TTI of the first multi-TTI grant. In such examples, the retransmitted multi-TTI grant may increase the likelihood that the control information and data being transmitted is successfully decoded.

In yet other examples, a base station may transmit a first multi-TTI grant and then may subsequently transmit a second multi-TTI grant during a TTI of the first multi-TTI grant. The second multi-TTI grant may at least partially overwrite some of the control information (e.g., MCS, rank, RB allocation, TTI length) that was initially conveyed in the first multi-TTI grant. In such examples, a base station may flexibly reschedule resources or transmission processes (e.g., HARQ processes) associated with a plurality of TTIs with a multi-TTI grant.

Similarly, for uplink communications, a base station may transmit multiple multi-TTI grants. In some cases, a base station may retransmit an uplink multi-TTI grant to increase the reliability of the transmission. Additionally or alternatively, a base station may transmit a first uplink multi-TTI grant and then may transmit a second uplink multi-TTI grant that replaces the first grant.

After a UE or base station decodes a received data burst, the receiving device may send an acknowledgment message to the transmitting device indicating which portions of the data burst (e.g., which HARQ processes) were successfully decoded and which portions were not. Such acknowledgment messaging that covers several TTIs (e.g., a group acknowledgment message) may indicate an ACK for successful decoding and a NACK for unsuccessful decoding. In some examples, the ACK/NACK messaging may indicate that data transmitted during certain TTIs was received by the receiver, but that sufficient time has not yet elapsed to determine whether the data was successfully decoded. In such cases, the receiver may follow up with a second ACK/NACK message that affirmatively indicates whether the received data was actually decoded or not.

Aspects of the disclosure introduced above are described below in the context of a wireless communications system. Examples of multiple multi-TTI grant messaging schemes are also described. Further, examples of group acknowledgement messaging are described in the context of multi-TTI grants. Aspects of the disclosure are further illustrated by and described with reference to apparatus diagrams, system diagrams, and flowcharts that relate to multi-TTI grant for HARQ feedback.

FIG. 1 illustrates an example of a wireless communications system 100 that supports HARQ feedback and multi-TTI scheduling in accordance with various aspects of the present disclosure. The wireless communications system 100 includes base stations 105, UEs 115, and a core network 130. In some examples, the wireless communications system 100 may be a long term evolution (LTE) network, LTE-Advanced network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may be a cellular phone, a wireless modem, a handheld device, a personal computer, a tablet, a personal electronic device, an MTC device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105. Base stations 105 may schedule communications with UEs 115 using multi-TTI grants, which may assign resources of several TTIs.

For example, time intervals in LTE may be expressed in multiples of a basic time unit (e.g., the sampling period, $T_s=1/30,720,000$ seconds), and may be organized according to radio frames of length 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 symbol periods (depending on the length of the cyclic prefix (CP) prepended to each symbol). Excluding the CP, each symbol contains 2048 sample periods.

In some cases the subframe may be the smallest scheduling unit, also known as a TTI. In other cases, a TTI may be shorter than a subframe or may be dynamically selected (e.g., in short TTI bursts or in selected component carriers (CCs) using short TTIs). Resources of multiple TTIs may be assigned in a single control message (e.g., a message in a downlink control channel). A TTI may be the minimum time between Medium Access Control (MAC) Protocol Data Units (PDUs) being passed down to the physical layer. It may also be the time over which data blocks are encoded for physical transmission. It may be a multiple of the radio subframe length.

In some cases, a control channel may be transmitted using resources that would otherwise be used for data transmission (i.e., a physical downlink control channel (PDSCH)). These control channels may be known as enhanced PDCCH or ePDCCH. Each ePDCCH set may have 2, 4, or 8 physical resource block (PRB) pairs. An ePDCCH may be scheduled using enhanced control channel elements (ECCEs) and enhanced resource element groups (EREGs). An ECCE may include 4 EREGs, and an EREG may include 9 resource elements (REs). In some cases, such as when a channel utilizes an extended CP or special subframes (e.g., in a TDD system), one ECCE may also consist of 8 EREGs. The number of ECCEs used for an ePDCCH may depend on the aggregation level. An ePDCCH may be UE-specific. That is, they may be transmitted exclusively using a UE-specific search space. In some cases, certain downlink control information (DCI) formats (e.g., DCI formats 3/3A and 1C for multiple UEs) may not be supported in an ePDCCH. In some cases, a UE 115 may not support ePDDCH if it does not have a sufficiently fast decoder, as the ePDCCH is decoded at the end of a subframe (because portions of it may fall in each symbol of the subframe), whereas PDCCH may be transmitted using the first few symbols of a subframe.

UEs 115 or base stations 105 may use retransmissions of data to successfully decode data in transmissions. HARQ feedback is one technique of increasing the likelihood that data is received correctly over a wireless communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In Incremental Redundancy HARQ, incorrectly received data (e.g., log likelihood ratio (LLR) data for a code block (CB)) may be stored in a buffer and combined with subsequent transmissions to improve the overall likelihood of successfully decoding the data. In some cases, redundancy bits are added to each message prior to transmission. Redundancy bits may be identified by a redundancy version identification (RVID), and transmission of redundancy bits may be particularly useful in situations with poor channel conditions.

In other cases, redundancy bits are not added to each transmission, but may be retransmitted after the transmitter of the original message receives a NACK indicating a failed attempt to decode the information. The chain of transmission, response and retransmission may be referred to as a HARQ process. In some cases, a limited number of HARQ processes may be used for a given communication link 125. Each HARQ process may be given a unique identifier referred to herein as a HARQ process identifier. As described herein, each TTI may include one TB. A TB may be a MAC PDU delivered to the physical layer. Each TB may be individually protected by a CRC and encoded as a single codeword for transmission. Each TB may also be associated with a different HARQ process. So each TTI, including each TTI of a multi-TTI grant, may be associated with a different HARQ process.

In some cases, wireless communications system 100 may utilize one or more enhanced component carriers (eCCs). An eCC may be characterized by one or more features including: flexible bandwidth, different TTIs, and modified control channel configuration. In some cases, an eCC may be associated with a carrier aggregation configuration or a dual connectivity configuration (e.g., when multiple serving cells have suboptimal backhaul link). An eCC may also be configured for use in unlicensed spectrum or shared spectrum (e.g., where more than one operator is licensed to use the spectrum). When using shared spectrum, a transmitter may perform listen before talk (LBT) procedure prior to transmitting on a wireless channel to confirm that the channel is available for transmission. An eCC characterized by flexible bandwidth may include one or more segments that may be utilized by a UE that may not be capable of monitoring the whole bandwidth or prefer to use a limited bandwidth (e.g., to conserve power).

In some cases, an eCC may utilize a different TTI length than other CCs, which may include use of a reduced or variable symbol duration as compared with TTIs of the other CCs. The symbol duration may remain the same, in some cases, but each symbol may represent a distinct TTI. In some examples, an eCC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods. In some cases, a shorter symbol duration may also be associated with increased subcarrier spacing. In conjunction with the reduced TTI length, an eCC may utilize dynamic time division duplex (TDD) operation (i.e., it may switch from downlink to uplink operation for short bursts according to dynamic conditions).

Flexible bandwidth and variable TTIs may be associated with a modified control channel configuration (e.g., an eCC may utilize an ePDCCH for downlink control information). For example, one or more control channels of an eCC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length uplink and downlink bursts), or control channels transmitted at different intervals. An eCC may also include modified additional HARQ related control information.

Various aspects of the present disclosure provide for transmitting a downlink control message that includes an uplink or downlink multi-TTI grant that indicates which HARQ processes are included in the grant. Additionally, various aspects of the disclosure provide for group ACK/NACK feedback related to HARQ processes included in multi-TTI grants. In some examples, a base station 105 may transmit a downlink multi-TTI grant to a UE 115 including a HARQ processes bitmap that indicates the number of HARQ processes and which HARQ process identifiers of a predetermined set of identifiers are included in the grant.

Figure 2:
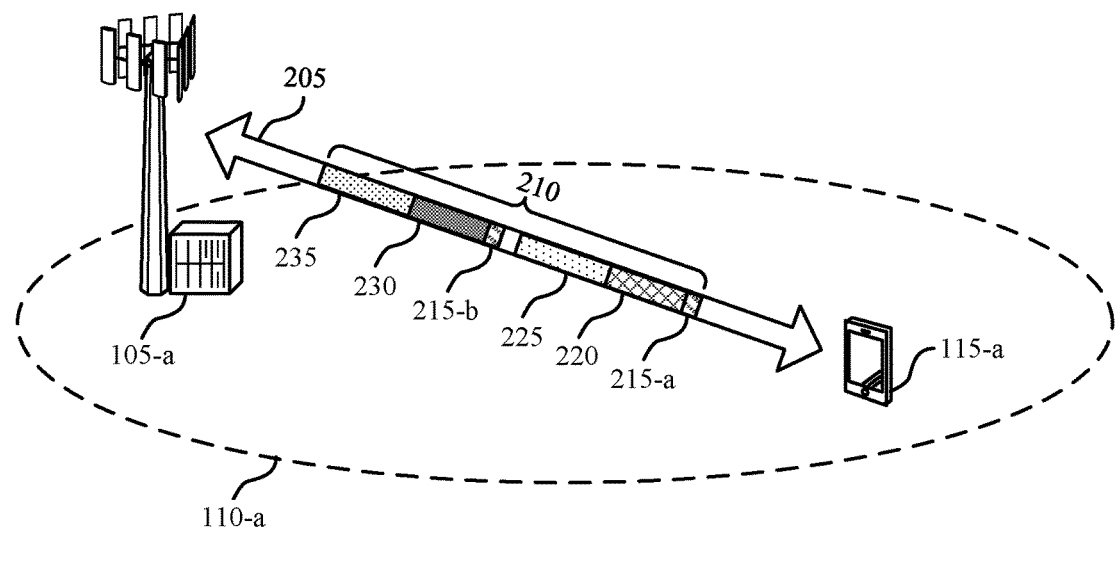
FIG. 2 illustrates an example of a wireless communications system that supports HARQ feedback and multi-TTI scheduling in accordance with various aspects of the present disclosure.
Figure 2:
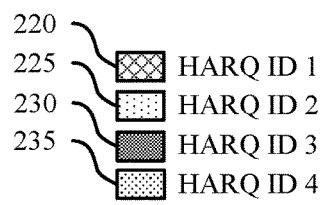

FIG. 2 illustrates an example of a wireless communications system 200 for multi-TTI grant and group ACK/NACK design for eCC. Wireless communications system 200 may include a base station 105-$a$ and a UE 115-$a$, which may be examples of corresponding devices described with reference to FIG. 1. Base station 105-$a$ and UE 115-$a$ may communicate using a bi-directional communications link 205. During a data burst 210, the base station 105-$a$ may transmit one or more multi-TTI grants 215 to the UE 115-$a$ indicating resource allocations and control information for subsequent uplink or downlink data transmissions.

A multi-TTI grant 215 may include control information (e.g., a DCI field) indicating which HARQ processes are associated with data being transmitted during the TTIs included in the grant. This control information may be included in the first one to three symbol periods of a TTI (or any other control field within a TTI). For example, multi-TTI grant 215-$a$ may include information indicating which HARQ processes are associated with data being transmitted during TTI 220 and TTI 225. Similarly, multi-TTI grant 215-$b$ may include information indicating which HARQ processes are associated with data being transmitted during TTI 230 and TTI 235. Although multi-TTI grant 215-$a$ and multi-TTI-grant 215-$b$ are described as including two TTIs, it should be appreciated that any number of TTIs may be included in a multi-TTI grant.

A HARQ process may be identified by a unique identifier referred to herein as a HARQ process identifier. For example, the HARQ process associated with TTI 220 may be identified as HARQ ID 1 and the HARQ process associated with TTI 225 may be identified as HARQ ID 2. In some examples, base station 105-$a$ may assign one HARQ process (i.e., one unique HARQ process identifier) per TTI (e.g., one HARQ process per TB). Also, in some cases, the base station 105-$a$ may assign a predetermined maximum number of HARQ processes (e.g., 16) for a particular data burst 210 or a particular communications link 205. In some cases, the maximum number of HARQ processes is preconfigured and/or may be dynamically updated by the base station 105-$a$ or UE 115-$a$.

In some examples, a multi-TTI grant 215 may include a HARQ processes bitmap (e.g., 16 bits) indicating the HARQ process identifiers associated with data transmissions occurring during the TTIs included in the multi-TTI grant 215. For example, the HARQ processes bitmap may include a value (e.g., a one (1)) in numbered locations within the bitmap to indicate that HARQ process identifiers corresponding to those numbered locations are included in the multi-TTI grant 215. Similarly, the HARQ process bitmap may include a different value (e.g., a zero (0)) in numbered locations within the bitmap to indicate that HARQ process identifiers corresponding to those numbered locations are not included in the multi-TTI grant 215. Additionally, in examples where the base station 105-*a* assigns one HARQ process per TTI, the HARQ process bitmap may also indicate the number of TTIs that are included in a particular multi-TTI grant 215. For example, multi-TTI grant 215-*a* may include a HARQ process bitmap that indicates to the UE 115-*a* that HARQ processes with HARQ ID 1 and HARQ ID 2 are associated with data transmission in TTI 220 and TTI 225. Similarly, multi-TTI grant 215-*b* may include a HARQ process bitmap that indicates to the UE 115-*a* that HARQ processes HARQ ID 3 and HARQ ID 4 are associated with data transmission in TTI 230 and TTI 235.

Additionally, a multi-TTI grant 215 may include control information related to a modulation and coding scheme (MCS), rank, resource block (RB) allocation, and the like, for the data transmissions over the TTIs included in the grant. In some cases, the control information applies to all of the TTIs included in the multi-TTI grant 215. As described in further detail below, in some cases, the base station 105-*a* may dynamically update the control information between multi-TTI grants 215 and/or over the course of the TTIs included in a multi-TTI grant 215.

Additionally, a multi-TTI grant 215 may include a new data indicator (NDI) field that indicates whether data transmitted during a particular TTI is new or a retransmission of data. The NDI field may indicate that data associated with a particular HARQ process identifier is new data by flipping the value of bits between grants (e.g., between multi-TTI grant 215-*a* and multi-TTI grant 215-*b*) in numbered locations within the fields that correspond to those HARQ process identifiers. Similarly, the NDI field may indicate that data associated with a particular HARQ process identifier is a retransmission of data by keeping the value of bits corresponding to those HARQ processes the same between grants. In some cases, the length of the NDI field may be equal to the number of HARQ process identifiers included in the grant (e.g., the number of bits set to one (1) in the HARQ processes bitmap). However, this implementation may be complex since the length of the NDI field may change for different grants that include different numbers of HARQ processes.

In other cases, the length of the NDI field may be fixed (e.g., 12 bits long), and the length may be based on the duration of a transmission opportunity (e.g., the transmission opportunity of data burst 210). For example, if the maximum transmission opportunity for a particular data burst is 6 ms, then a maximum of 12 HARQ processes may be included in that data burst. Accordingly, the length of the NDI field may be set to twelve. Also, in such cases, if less than twelve HARQ processes are included in a data burst, then the NDI field may be padded to twelve with zeros. In yet other cases, the length of the NDI field may be equal to the length of the HARQ process bitmap.

UE 115-*a* and base station 105-*a* may establish a HARQ process transmission order to coordinate which TTIs of a multi-TTI grant 215 include which HARQ process identifiers. In some cases, the multi-TTI grant 215 may indicate which HARQ process identifiers are included in the grant, but may not indicate an explicit transmission order for the HARQ processes. As such, UE 115-*a* may infer the transmission order of the HARQ processes based on some previously agreed upon deterministic order of the HARQ process identifiers included in the grant (e.g., numerically ascending or descending order). In other cases, base station 105-*a* and UE 115-*a* may communicate and determine a fixed transmission order for each multi-TTI grant or for the duration of a particular communications session. In yet other cases, the transmission order of HARQ process identifiers may be arranged based on whether the data being transmitted is new or a retransmission of previous data. In some examples, HARQ process identifiers associated with new data are ordered first followed by HARQ process identifiers associated with retransmission data, or vice versa.

In some examples, base station 105-*a* may transmit multiple, non-overlapping, multi-TTI grants 215 associated with downlink communication with UE 115-*a* (e.g., downlink multi-TTI grants). For example, base station 105-*a* may transmit multi-TTI grant 215-*a*, and then after all the TTIs included in multi-TTI grant 215-*a* have elapsed (e.g., after TTI 225), the base station 105-*a* may transmit multi-TTI grant 215-*b*. In such cases, base station 105-*a* may change system configurations between grants such as an MCS, rank, RB allocation, and the like. That is, a first multi-TTI grant 215-*a* may indicate configurations associated with a first set of HARQ processes (e.g., HARQ ID 1 220 and HARQ ID 2 225) and a second multi-TTI grant 215-*b* may indicate configurations associated with a second set of HARQ processes (e.g., HARQ ID 3 230 and HARQ ID 4 235) that may be different from configurations indicated in the first multi-TTI grant 215-*a*. To prevent potential confusion at UE 115-*a*, base station 105-*a* may avoid transmitting the same HARQ process identifier in two different grants in the same burst 210. However, if a HARQ process is to be retransmitted (e.g., due to failure to decode) base station 105-*a* may transmit the same HARQ process identifier associated with the retransmitted HARQ process in different multi-TTI grants with the same TB size and NDI. In such cases, UE 115-*a* may interpret the multiple transmissions as a retransmission of the HARQ process without feedback.

In other examples, base station 105-*a* may support retransmission of a multi-TTI grant 215 associated with downlink communication with UE 115-*a*. In some cases, retransmission of the same multi-TTI grant 215 within a data burst 210 may increase the chances that HARQ processes are successfully received by UE 115-*a*. For example, base station 105-*a* may transmit a first multi-TTI grant 215-*a* that includes information for all the of HARQ processes in the grant (e.g., HARQ ID 1 220 and HARQ ID 2 225). But, at some point during either TTI 220 or TTI 225, base station 105-*a* may then retransmit the first grant 215-*a* (e.g., if control resources become available) thereby giving UE 115-*a* another opportunity to decode the HARQ processes in the TTI that includes the retransmission and subsequent TTIs. The retransmitted multi-TTI grant 215-*a* may include information for the HARQ processes for the TTI that the retransmitted grant was sent in and for subsequent TTIs, but may not include information for HARQ processes in TTIs previous to the retransmission. The retransmission of the first multi-TTI grant 215-*a* may be consistent with the first transmission of the multi-TTI grant 215-*a* so that UE 115-*a* may interpret the second multi-TTI grant 215-*a* as a retransmission instead of an overwriting grant. Alternatively, the UE 115-*a* may always treat a second multi-TTI grant 215-*a* as an overwriting grant, and may read the control information from the second grant without comparing the control information to that received in the first grant.

In yet other examples, base station 105-*a* may support transmission of a multi-TTI grant 215 that partially overwrites a previously transmitted multi-TTI grant 215. In such examples, base station 105-*a* may change system configurations such as an MCS, rank, RB allocation, and the like, between the first multi-TTI grant 215 and the overwriting multi-TTI grant 215. For example, base station 105-*a* may transmit a first multi-TTI grant 215-*a* that includes information for all of the HARQ processes in the grant (e.g., HARQ ID 1 220 and HARQ ID 2 225) and then, during TTI 220 or TTI 225, the base station 105-*a* may transmit a second multi-TTI grant 215-*b* that at least partially overwrites the first multi-TTI grant 215-*a*. The second multi-TTI grant 215-*b* may at least partially overwrite the first multi-TTI grant 215-*a* by changing one or more system configurations (e.g., MCS, rank, RB allocation, and the like) for HARQ processes in one or more TTIs covered by the initial multi-TTI grant 215-*a*. In most cases, the second multi-TTI grant 215-*b* may include information for HARQ processes in the TTI that the second multi-TTI grant 215-*b* was received in and subsequent TTIs, but may not include information for HARQ processes in TTIs previous to the overwriting grant.

Additionally, base station 105-*a* may transmit one or more multi-TTI grants 215 associated with uplink communication with UE 115-*a* (e.g., uplink multi-TTI grant). In most cases, base station 105-*a* may transmit one uplink multi-TTI grant 215 per data burst 210. Additionally, base station 105-*a* may support multiple transmissions of the same uplink multi-TTI grant 215 to increase reliability. In some cases, base station 105-*a* may transmit a first uplink multi-TTI grant 215-*a* and then a second uplink multi-TTI grant 215-*b* (e.g., transmitted in a later downlink TTI). In such cases, the second multi-TTI grant 215-*b* may replace the earlier grant. However, in some examples the base station 105-*a* may not transmit multiple uplink multi-TTI grants 215 with different content in the same downlink data burst.

In the context of uplink communications, before transmitting data, UE 115-*a* may perform a clear channel assessment (CCA) and/or an enhanced CCA (eCCA). While UE 115-*a* is performing the CCA or eCCA, an uplink data transmission may be delayed. During the delay, the UE 115-*a* may begin encoding the data to be transmitted so that once the CCA or eCCA has passed, the UE 115-*a* is ready to transmit the data in the TTI that the CCA passed instead of having to re-encode the data. In some examples, the base station 105-*a* may use rate matching to determine the appropriate bitmap to represent the HARQ process identifiers included in the uplink multi-TTI grant 215. In some cases, rate matching may include using the available resources and the previously encoded bits to determine the appropriate bitmap to represent the HARQ process identifiers included in the grant.

UE 115-*a* may also transmit an acknowledgement (ACK) or a negative-acknowledgement (NACK) to base station 105-*a* after receiving the data included in a multi-TTI grant 215. In some cases, an acknowledgment message may include an ACK/NACK bitmap (e.g., 16 bits) to indicate which HARQ process identifiers were successfully decoded and which were not. For example, the ACK/NACK bitmap may include a value (e.g., a one (1)) in numbered locations within the bitmap to indicate that a HARQ process corresponding to those numbered locations were received and successfully decoded or received but not yet decoded. Similarly, the ACK/NACK bitmap may include a value (e.g., a zero (0)) in numbered locations within the bitmap to indicate that a HARQ process corresponding to those numbered locations were not received or not successfully decoded.

In some cases, base station 105-*a* may retrigger UE 115-*a* to send another ACK/NACK message using a certain multi-TTI grant (e.g., empty multi-TTI grant). In such cases, base station 105-*a* may use a HARQ process bitmap to retrigger ACK/NACK associated with certain HARQ processes. For example, a HARQ process bitmap may include a value (e.g., one (1)) in numbered locations within the bitmap to indicate that UE 115-*a* should retransmit an ACK/NACK for a HARQ process corresponding to those numbered locations. Similarly, a HARQ process bitmap may include a value (e.g., a zero (0)) in numbered locations within the bitmap to indicate that UE 115-*a* should not retransmit an ACK/NACK for a HARQ process corresponding to those numbered locations. Additionally, the NDI bitmap may be configured with the same bits as the HARQ process bitmap. The inclusion of a similar NDI bitmap may increase the chance that the message is received by UE 115-*a* (e.g., when there is a chance of grant loss). Instead of transmitting an ACK/NACK, base station 105-*a* may communicate that information is received or not received by, for example, flipping bits in the NDI field.

In some cases, base station 105-*a* may transmit HARQ process information using an uplink or downlink multi-TTI grant 215 with additional bits. In some cases, base station 105-*a* may not include RVID information in a DCI field (e.g., RVID=0) to reduce the number of additional bits included in the uplink or downlink multi-TTI grant 215. Instead, base station 105 may use chase combining HARQ for error correction rather than incremental redundancy (IR) HARQ (e.g., with or without turbo coding (TC)). However, in some cases, base station 105-*a* may support IR HARQ to improve error correction. Additionally, base station 105-*a* may not include the before and after field (e.g., 8 bits) and the mayday bit (e.g., 1 bit) in the grant to reduce the number of additional bits included in the uplink or downlink grant. In some examples, the link budget associated with UE 115-*a* may support the increased payload, and base station 105 may increase an aggregation level associated with UE 115 to further support the increased payload.

Figure 3A:
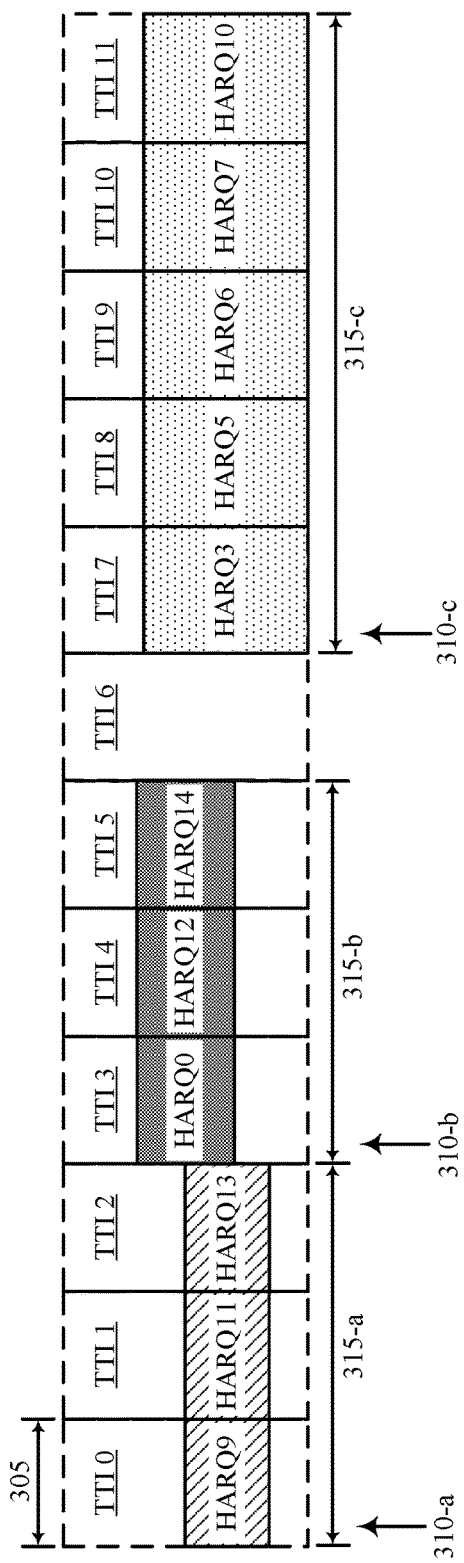
FIGS. 3A-3C illustrate examples of downlink multi-TTI grant messages that support HARQ feedback and multi-TTI scheduling in accordance with various aspects of the present disclosure.

FIG. 3A illustrates an example of a data burst 300-*a* which may include multiple data transmissions in multiple TTIs 305. In some cases, data burst 300-*a* may include multiple, non-overlapping, multi-TTI grants 310 associated with downlink communication with a UE 115, in accordance with various aspects of the present disclosure. In this example, three multi-TTI grants 310-*a*, 310-*b*, and 310-*c* are each transmitted in a different TTI 305 over the course of a 12 TTI length data burst. The 12 TTIs are labeled as TTI 0-TTI 11. Each multi-TTI grant 310 may include information related to a group of TTIs 305 (e.g., TTI groups 315-*a*, 315-*b*, and 315-*c*) associated with the multi-TTI grant 310. Also, in this example, each TTI 305 may be associated with a unique HARQ process identifier.

A base station 105 may transmit a multi-TTI grant 310-*a* in TTI 0 of the data burst. The multi-TTI grant 310-*a* may include information (e.g., a bitmap) related to the multiple HARQ processes included in the TTI group 315-*a* covered by the multi-TTI grant 310-*a* (i.e., TTI 0, TTI 1, and TTI 2). For example, the multi-TTI grant 310-*a* may indicate the number of HARQ processes included in the multi-TTI grant 310-*a* and may indicate which HARQ process identifiers are included in the multi-TTI grant 310-*a*. Additionally, the multi-TTI grant 310-*a* may include information about an MCS, rank, RB allocation, and the like, associated with the HARQ processes for the TTI group 315-*a*.

In some examples, a base station 105 may transmit a first multi-TTI grant 310-*a* in TTI 0 that includes a HARQ process bitmap "0000000001010100" for TTI group 315-*a*. This bitmap includes three 1's at positions 9, 11 and 13 respectively. In some cases, a UE 115 may decode this bitmap to interpret that data transmissions with HARQ process identifiers 9, 11 and 13 (i.e., HARQ9, HARQ11 and HARQ13) are included in the multi-TTI grant 310-*a*. A UE 115 may also interpret from this bitmap that there are three TTIs 305 included in the TTI group 315-*a*. The RB allocation, MCS, rank, PMI, and the like, may apply to all three TTIs 305 in TTI group 315-*a*.

The multi-TTI grant 310-*a* may also include an NDI field to indicate whether data transmitted during any of the TTIs 305 in TTI group 315-*a* is new data or a retransmission of data. The NDI field may also be in the form of a bitmap. The bitmap may either have a length that corresponds with the number of TTIs 305 in the TTI group 315-*a* or may have a fixed length (e.g., 12 bits). The NDI bitmap for multi-TTI grant 310-*a* may include three valid entries that correspond to the three HARQ process included in TTI group 315-*a*. For each entry, a flipped value may indicate that the corresponding HARQ process is associated with new data, whereas the same value for a particular HARQ process may indicate that data associated with that HARQ process is being retransmitted (e.g., after a failure to decode). The bitmap may have a total length of three or may include the three entries followed by zero padding bits to fill up the fixed bitmap length (e.g., 9 bits).

A base station 105 may then transmit a second multi-TTI grant 310-*b* in a TTI 305 subsequent to the TTI group 315-*a* (e.g., in TTI 3). Multi-TTI grant 310-*b* may also include a HARQ process bitmap that indicates information for the HARQ processes included in the corresponding TTI group 315-*b*. For example, the HARQ process bitmap may be "1000000000001010" for TTI group 315-*b*. This bitmap includes three 1's at positions 0, 12 and 14 respectively. In some cases, a UE 115 may decode this HARQ process bitmap to interpret that HARQ process identifiers HARQ0, HARQ12 and HARQ14 are included in the multi-TTI grant 310-*b*. The UE 115 may also interpret from this bitmap that there are three TTIs 305 granted in the TTI group 315-*b* starting from TTI 3. Similar to multi-TTI grant 310-*a*, multi-TTI grant 310-*b* may include an NDI field, which may include three valid entries that correspond to HARQ process identifiers HARQ0, HARQ12, and HARQ14 respectively, followed by nine zero padding bits.

Additionally, a base station 105 may transmit a third multi-TTI grant 310-*c* in a TTI 305 subsequent to the TTI group 315-*b* (e.g., in TTI 7). Multi-TTI grant 310-*b* may also include a HARQ process bitmap "0001011100100000" for TTI group 315-*c*. This bitmap includes five 1's at positions 3, 5, 6, 7, and 10 respectively. In some cases, a UE 115 may decode this HARQ process bitmap to interpret that HARQ process identifiers HARQ3, HARQ5, HARQ6, HARQ7, and HARQ10 are included in the multi-TTI grant 310-*c*. The UE 115 may also interpret from this bitmap that there are five TTIs 305 granted in the TTI group 315-*c* starting from TTI 7. Similar to multi-TTI grants 310-*a* and 310-*b*, multi-TTI grant 310-*c* may include an NDI field, which may include five valid entries that correspond to HARQ process identifiers HARQ3, HARQ5, HARQ6, HARQ7, and HARQ10 respectively, followed by seven zero padding bits.

Figure 3B:
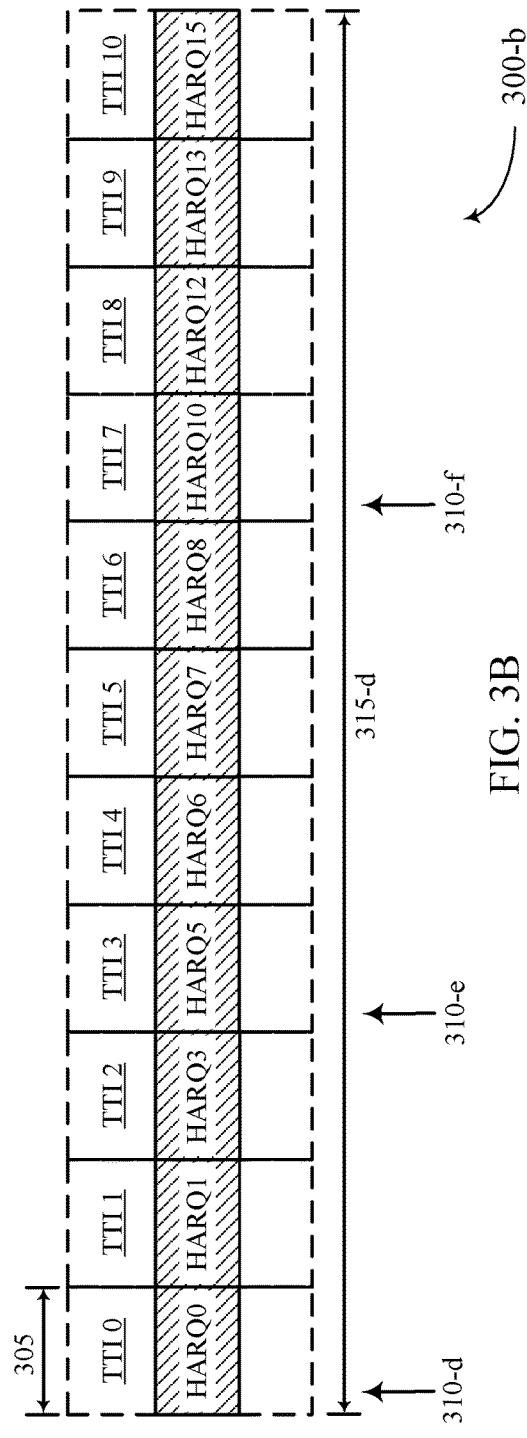

FIG. 3B illustrates an example of a data burst 300-*b* which may include multiple data transmissions in multiple TTIs 305. In some cases, data burst 300-*b* may include multiple multi-TTI grants 310 that include an initial grant and retransmitted grants associated with downlink communication with a UE 115, in accordance with various aspects of the present disclosure. In this example, three multi-TTI grants 310-*d*, 310-*e*, and 310-*f* are each transmitted in a different TTI 305 over the course of an 11 TTI length data burst. The 11 TTIs are labeled as TTI 0-TTI 10. Each multi-TTI grant 310 may include information related to the same group of TTIs 305 in the data burst 300-*b* (e.g., TTI group 315-*d*) associated with the multi-TTI grant 310. Also, in this example, each TTI 305 may be associated with a unique HARQ process identifier.

A base station 105 may transmit a multi-TTI grant 310-*d* in TTI 0 of the data burst. The multi-TTI grant 310-*d* may include information (e.g., a bitmap) related to the multiple HARQ processes included in the TTI group 315-*d* covered by the multi-TTI grant 310-*d* (i.e., TTI 0-TTI 10). For example, the multi-TTI grant 310-*d* may indicate the number of HARQ processes included in the multi-TTI grant and may indicate which HARQ process identifiers are included in the multi-TTI grant 310-*d*. Additionally, the multi-TTI grant 310-*d* may include information about an MCS, rank, RB allocation, and the like, associated with the HARQ processes for the TTI group 315-*d*.

In some examples, a base station 105 may transmit a first multi-TTI grant 310-*d* in TTI 0 that includes a HARQ process bitmap "1101011110101101" for TTI group 315-*d*. This bitmap includes 11 1's at positions 0, 1, 3, 5, 6, 7, 8, 10, 12, 13, and 15 respectively. In some cases, a UE 115 may decode this bitmap to interpret that data transmissions with HARQ process identifiers 0, 1, 3, 5, 6, 7, 8, 10, 12, 13, and 15 (i.e., HARQ 0, HARQ1, HARQ3, HARQ5, HARQ6, HARQ7, HARQ8, HARQ10, HARQ12, HARQ13, and HARQ15) are included in the multi-TTI grant 310-*d*. A UE 115 may also interpret from this bitmap that there are 11 TTIs 305 included in the TTI group 315-*d*. The RB allocation, MCS, rank, PMI, and the like, may apply to all 11 TTIs in TTI group 315-*d*. The multi-TTI grant 310-*d* may also include an NDI field, which may include 11 valid entries that correspond to HARQ process identifiers 0, 1, 3, 5, 6, 7, 8, 10, 12, 13, and 15 respectively, followed by one zero padding bit.

A base station may then retransmit the first multi-TTI grant 310-*e* in a TTI 305 within the TTI group 315-*d* (e.g., in TTI 3). Multi-TTI grant 310-*e* may also include a HARQ process bitmap that indicates information for the HARQ processes included in the TTI that the retransmitted grant was sent in and for subsequent TTIs (e.g., TTI 3-TTI 10). For example, the HARQ process bitmap may be "0000011110101101" for the corresponding TTIs in TTI group 315-*d*. This bitmap includes eight 1's at positions 5, 6, 7, 8, 10, 12, 13, and 15 respectively. In some cases, a UE 115 may decode this HARQ process bitmap to interpret that data transmissions with HARQ process identifiers 5, 6, 7, 8, 10, 12, 13, and 15 (i.e., HARQ5, HARQ6, HARQ7, HARQ8, HARQ10, HARQ12, HARQ13, and HARQ15) are included in the multi-TTI grant 310-*e*. The UE 115 may also interpret from this bitmap that there are eight TTIs 305 granted in the TTI group 315-*d* starting from TTI 3. Similar to multi-TTI grant 310-*d*, multi-TTI grant 310-*e* may include an NDI field, which may include eight valid entries that correspond to HARQ process identifiers 5, 6, 7, 8, 10, 12, 13, and 15 respectively, followed by four zero padding bit.

Additionally, a base station may retransmit the first multi-TTI grant 310-*f* in a TTI 305 within the TTI group 315-*d* (e.g., in TTI 7). Multi-TTI grant 310-*f* may also include a HARQ process bitmap that indicates information for the HARQ processes included in the TTI that the retransmitted grant was sent in and for subsequent TTIs (e.g., TTI 7-TTI 10). For example, the HARQ process bitmap may be "0000000000101101" for the corresponding TTIs in TTI group 315-*d*. This bitmap includes four 1's at positions 10, 12, 13, and 15 respectively. In some cases, a UE 115 may decode this HARQ process bitmap to interpret that data transmissions with HARQ process identifiers 10, 12, 13, and 15 (i.e., HARQ10, HARQ12, HARQ13, and HARQ15) are included in the multi-TTI grant **310-*f*. The UE 115 may also interpret from this bitmap that there are four TTIs 305 granted in the TTI group 315-*d* starting from TTI 7. Similar to multi-TTI grant 310-*d* and multi-TTI grant 310-*e*, multi-TTI grant 310-*f* may include an NDI field, which may include four valid entries that correspond to HARQ process identifiers 10, 12, 13, and 15** respectively, followed by eight zero padding bits.

Figure 3C:
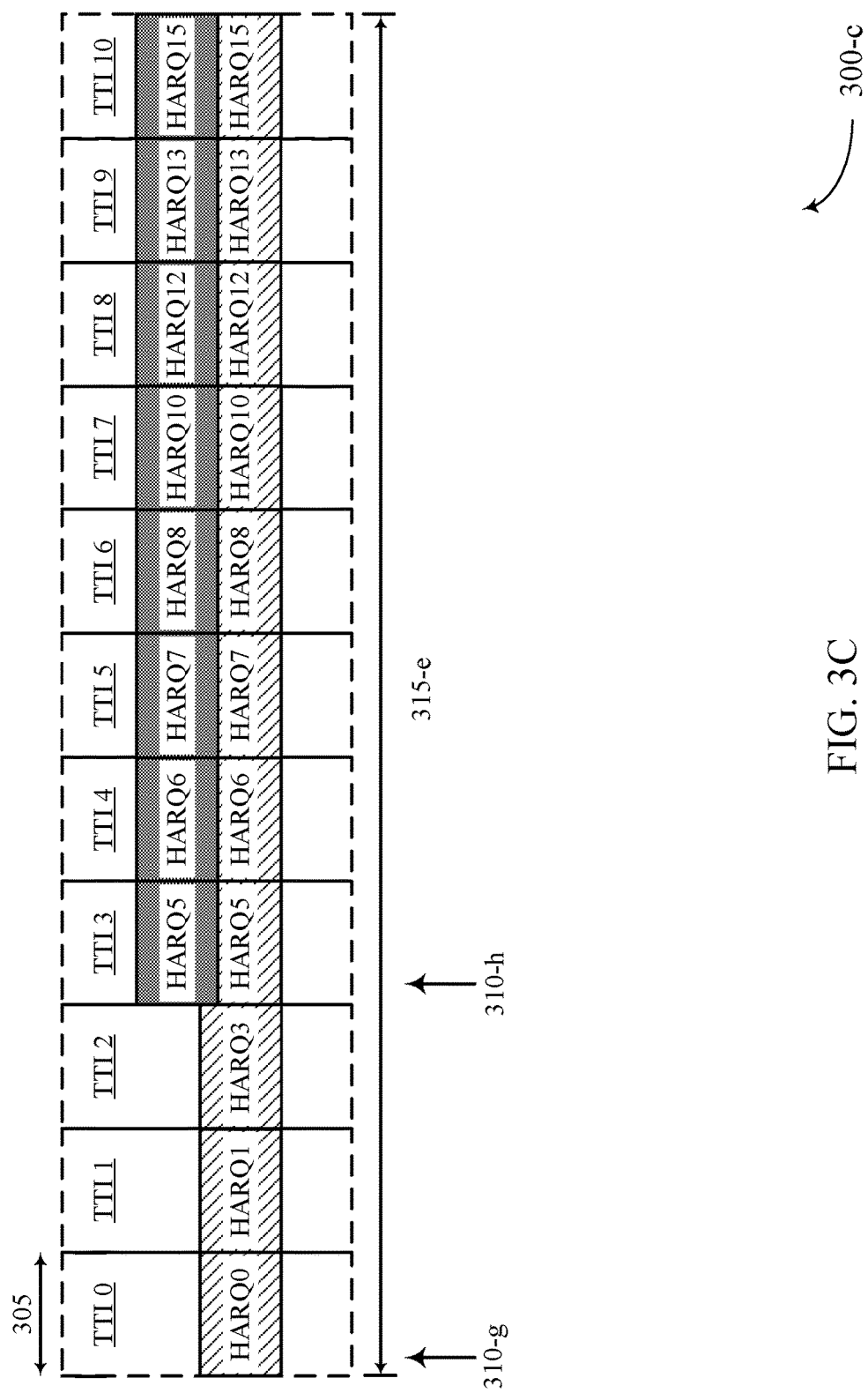

FIG. 3C illustrates an example of a data burst **300-*c* which may include multiple data transmissions in multiple TTIs 305. In some cases, data burst 300-*c* may include multiple multi-TTI grants 310 that include an initial grant and a partially overwriting grant associated with downlink communication with a UE 115, in accordance with various aspects of the present disclosure. In this example, two multi-TTI grants 310-*g* and 310-*h* are each transmitted in a different TTI 305 over the course of an 11 TTI length data burst. The 11 TTIs are labeled as TTI 0-TTI 10. Each multi-TTI grant 310 may include information related to the same group of TTIs 305 in the data burst 300-*b* (e.g., TTI group 315-*e*) associated with the multi-TTI grant 310. Also, in this example, each TTI 305** may be associated with a unique HARQ process identifier.

A base station 105 may transmit a multi-TTI grant **310-*g* in TTI 0 of the data burst. The multi-TTI grant 310-*g* may include information (e.g., a bitmap) related to the multiple HARQ processes included in the TTI group 315-*e* covered by the multi-TTI grant 310-*g* (i.e., TTI 0-TTI 10). For example, the multi-TTI grant 310-*g* may indicate the number of HARQ processes included in the multi-TTI grant and may indicate which HARQ process identifiers are included in the multi-TTI grant 310-*g*. Additionally, the multi-TTI grant 310-*g* may include information about an MCS, rank, RB allocation, and the like, associated with the HARQ processes for the TTI group 315-*e*.**

In some examples, a base station 105 may transmit a first multi-TTI grant **310-*g* in TTI 0 that includes a HARQ process bitmap "1101011110101101" for TTI group 315-*e*. This bitmap includes 11 1's at positions 0, 1, 3, 5, 6, 7, 8, 10, 12, 13, and 15 respectively. In some cases, a UE 115 may decode this bitmap to interpret that data transmissions with HARQ process identifiers 0, 1, 3, 5, 6, 7, 8, 10, 12, 13, and 15 (i.e., HARQ 0, HARQ1, HARQ3, HARQ5, HARQ6, HARQ7, HARQ8, HARQ10, HARQ12, HARQ13, and HARQ15) are included in the multi-TTI grant 310-*g*. A UE 115 may also interpret from this bitmap that there are 11 TTIs 305 included in the TTI group 315-*e*. The RB allocation, MCS, rank, PMI, and the like, may apply to all 11 TTIs in TTI group 315-*e*. The multi-TTI grant 310-*g* may also include an NDI field, which may include 11 valid entries that correspond to HARQ process identifiers 0, 1, 3, 5, 6, 7, 8, 10, 12, 13, and 15** respectively, followed by one zero padding bit.

A base station may then transmit a second multi-TTI grant **310-*h* in a TTI 305 within the TTI group 315-*e* (e.g., in TTI 3). Multi-TTI grant 310-*h* may also include a HARQ process bitmap that indicates information for the HARQ processes included in the TTI that the overwriting grant was sent in and for subsequent TTIs (e.g., TTI 3-TTI 10). For example, the HARQ process bitmap may be "0000011110101101" for the corresponding TTIs in TTI group 315-*e*. This bitmap includes eight 1's at positions 5, 6, 7, 8, 10, 12, 13, and 15 respectively. In some cases, a UE 115 may decode this HARQ process bitmap to interpret that data transmissions with HARQ process identifiers 5, 6, 7, 8, 10, 12, 13, and 15 (i.e., HARQ5, HARQ6, HARQ7, HARQ8, HARQ10, HARQ12, HARQ13, and HARQ15) are included in the multi-TTI grant 310-*h*. The UE 115 may also interpret from this bitmap that there are eight TTIs 305 granted in the TTI group 315-*e* starting from TTI 3. In some cases, the overwriting multi-TTI grant 310-*h* may include different system configurations (e.g., RB allocation, MCS, rank, PMI, and the like). Similar to multi-TTI grant 310-*g*, multi-TTI grant 310-*h* may include an NDI field, which may include eight valid entries that correspond to HARQ process identifiers 5, 6, 7, 8, 10, 12, 13, and 15** respectively, followed by four zero padding bits.

Figure 4A:
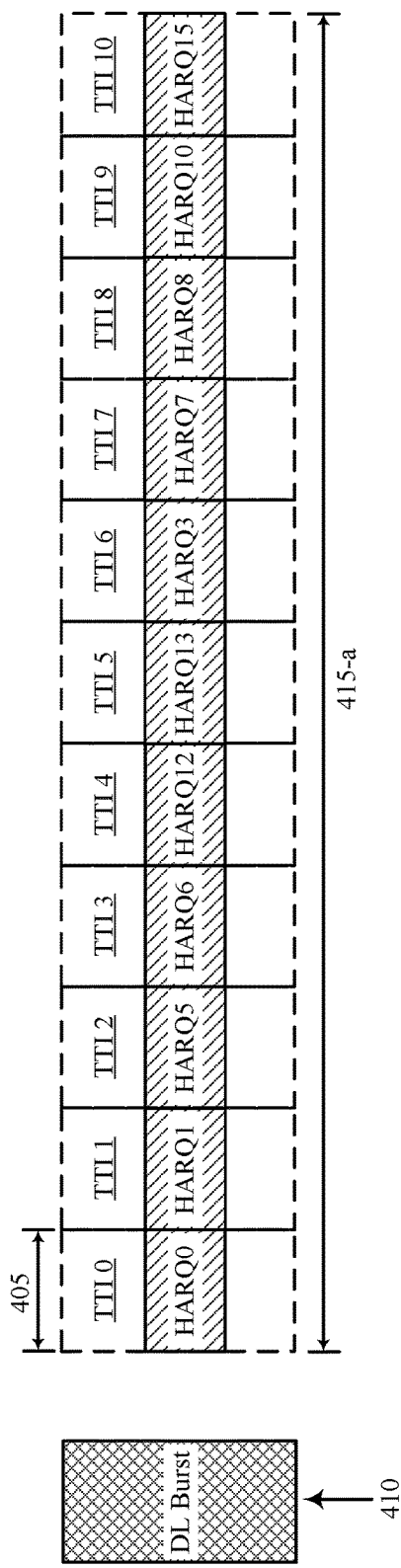
FIGS. 4A-4B illustrate examples of uplink multi-TTI grant messages that support HARQ feedback and multi-TTI scheduling in accordance with various aspects of the present disclosure.

FIG. 4A illustrates an example of a data burst **400-*a* which may include multiple data transmissions in multiple TTIs 405. In some cases, data burst 400-*a* may include a single multi-TTI grant 410 associated with uplink communication with a UE 115, in accordance with various aspects of the present disclosure. In this example, one multi-TTI grant 410 is transmitted in a downlink burst and corresponds to a group of 11 TTIs in an uplink data burst. The 11 TTIs are labeled as TTI 0-TTI 10. The multi-TTI grant 410 may include information related to a group of TTIs 405 in the data burst 400-*a* (e.g., TTI group 415-*a*) associated with the multi-TTI grant 410. Also, in this example, each TTI 405** may be associated with a unique HARQ process identifier.

A base station 105 may transmit a multi-TTI grant 410 in a downlink burst. The multi-TTI grant 410 may include information (e.g., a bitmap) related to the multiple HARQ processes included in the multiple TTI group **415-*a* covered by the multi-TTI grant 410 (i.e., TTI 0-TTI 10). For example, the multi-TTI grant 410 may indicate the number of HARQ processes included in the multi-TTI grant and may indicate which HARQ process identifiers are included in the multi-TTI grant 410. Additionally, the multi-TTI grant 410 may include information about an MCS, rank, RB allocation, and the like, associated with the HARQ processes for the TTI group 415-*a*.**

In some examples, a base station 105 may transmit one multi-TTI grant 410 in a downlink burst that includes a bitmap "1101011110101101" for TTI group **415-*a*. This bitmap includes 11 1's at positions 0, 1, 3, 5, 6, 7, 8, 10, 12, 13, and 15 respectively. In some cases, a UE 115 may decode this bitmap to interpret that data transmissions with HARQ process identifiers 0, 1, 3, 5, 6, 7, 8, 10, 12, 13, and 15 (i.e., HARQ 0, HARQ1, HARQ3, HARQ5, HARQ6, HARQ7, HARQ8, HARQ10, HARQ12, HARQ13, and HARQ15) are included in the multi-TTI grant 410. A UE 115 may also interpret from this bitmap that there are 11 TTIs 305 included in the TTI group 415-*a*. The RB allocation, MCS, rank, PMI, and the like, may apply to all 11 TTIs in TTI group 415-*a*.**

The multi-TTI grant 410 may also include an NDI field, which may include 11 valid entries that correspond to HARQ process identifiers 0, 1, 3, 5, 6, 7, 8, 10, 12, 13, and 15 respectively. For example, an NDI field may be 'FF0S0FFSS0S0FF0S,' where 'F' means flipped and 'S' means the same. In this case, a UE 115 may interpret that data transmissions associated with HARQ process identifiers 0, 1, 5, 6, 12, and 13 should include new data and data transmissions associated with HARQ process identifiers 3, 7, 8, 10, and 15 should include retransmissions. In some examples, a UE 115 may transmit HARQ processes 0, 1, 5,

6, 12, and 13 in the first six TTIs, and the UE may transmit HARQ processes 3, 7, 8, 10, and 15 in the subsequent five TTIs. UE 115 may then transmit data to base station 105 using the granted resources indicated in the multi-TTI grant 410.

Figure 4B:
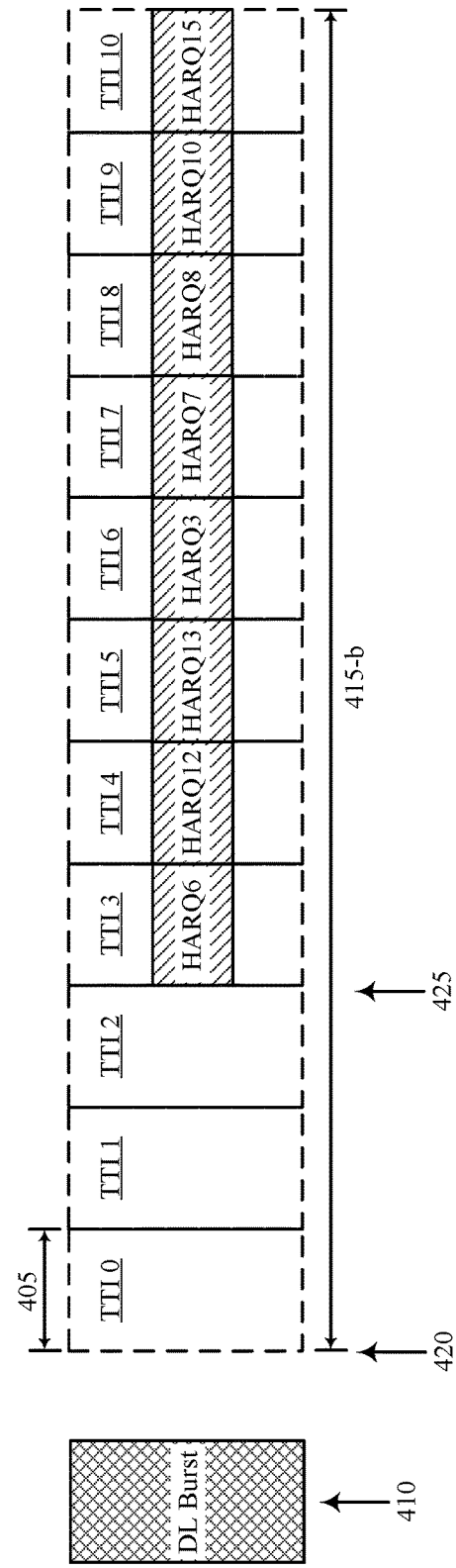

FIG. 4B illustrates an example of a data burst 400-*b* which may include multiple data transmissions in multiple TTIs 405. In some cases, data burst 400-*b* may include a single multi-TTI grant 410 associated with uplink communication with a UE 115 in the case of a delayed start, in accordance with various aspects of the present disclosure. In this example, one multi-TTI grant 410 is transmitted in a downlink burst and corresponds to a group of 11 TTIs in an uplink data burst 400-*b*. The 11 TTIs are labeled as TTI 0-TTI 10. The multi-TTI grant 410 may include information related to a group of TTIs 405 in the data burst 400-*b* (e.g., TTI group 415-*b*) associated with the multi-TTI grant 410. Also, in this example, each TTI 405 may be associated with a unique HARQ process identifier.

A base station 105 may transmit a multi-TTI grant 410 in a downlink burst. The multi-TTI grant 410 may include information (e.g., a bitmap) related to the multiple HARQ processes included in the multiple TTI group 415-*b* covered by the multi-TTI grant 410 (i.e., TTI 0-TTI 10). For example, the multi-TTI grant 410 may indicate the number of HARQ processes included in the multi-TTI grant and may indicate which HARQ process identifiers are included in the multi-TTI grant 410. Additionally, the multi-TTI grant 410 may include information about an MCS, rank, RB allocation, and the like, associated with the HARQ processes for the TTI group 415-*b*.

In some examples, a base station 105 may transmit one multi-TTI grant 410 in a downlink burst that includes a bitmap "1101011110101101" for TTI group 415-*b*. This bitmap includes 11 1's at positions 0, 1, 3, 5, 6, 7, 8, 10, 12, 13, and 15 respectively. In some cases, a UE 115 may decode the bitmap to interpret that data transmissions with HARQ process identifiers 0, 1, 3, 5, 6, 7, 8, 10, 12, 13, and 15 (i.e., HARQ 0, HARQ1, HARQ3, HARQ5, HARQ6, HARQ7, HARQ8, HARQ10, HARQ12, HARQ13, and HARQ15) are included in the multi-TTI grant 410. A UE 115 may also interpret from this bitmap that there are 11 TTIs 405 included in the TTI group 415-*b*. The RB allocation, MCS, rank, PMI, and the like, may apply to all 11 TTIs in TTI group 415-*b*.

In some examples, a wireless device may perform a CCA to determine if a channel is available before transmitting data over the channel. In this example, UE 115 may perform and fail a CCA at 420 (i.e., during TTI 0) and then may subsequently pass an eCCA at 425 (i.e., during TTI 3). As such, a UE 115 may drop the first three data transmissions associated with HARQ process identifiers 0, 1, and 3 (e.g., HARQ 0, HARQ1, and HARQ3) and may transmit the HARQ process identifiers associated with TTIs 3-10. This procedure may alleviate the need for the UE 115 to re-encode data or to wait to encode data until after passing the CCA or eCCA. As such, delays in transmission may be reduced.

In examples where transmissions during a delay caused by a CCA are dropped, a UE 115 or base station 105 may be scheduled to transmit new data first and retransmission data after. In such cases, the new data may be dropped during the delay, which may provide a higher chance that retransmissions are sent before new transmissions and are not further delayed. In other examples, instead of dropping data that was to be transmitted during the delay, the entire transmission may be pushed back until after the delay. In such examples, retransmission data may be ordered first to again prioritize retransmissions over new data transmissions. In some examples, the transmission order may follow the HARQ process identifier order (e.g., ascending or descending order) within each category (e.g., new data or retransmission).

A base station 105 may support the process of dropping new data transmissions for uplink grants since the base station 105 may be able to tell that the uplink grant is missing based on detecting the physical uplink shared channel (PUSCH) transmission. However, for downlink, the base station 105 may not be able to tell that data is missing from decoding failure, so the base station 105 may not support the process of dropping new data for downlink transmission. Additionally, the multi-TTI grant 410 may include information about an MCS, rank, RB allocation, and the like, associated with the HARQ processes for the TTI group 415-*b*.

Figure 5:
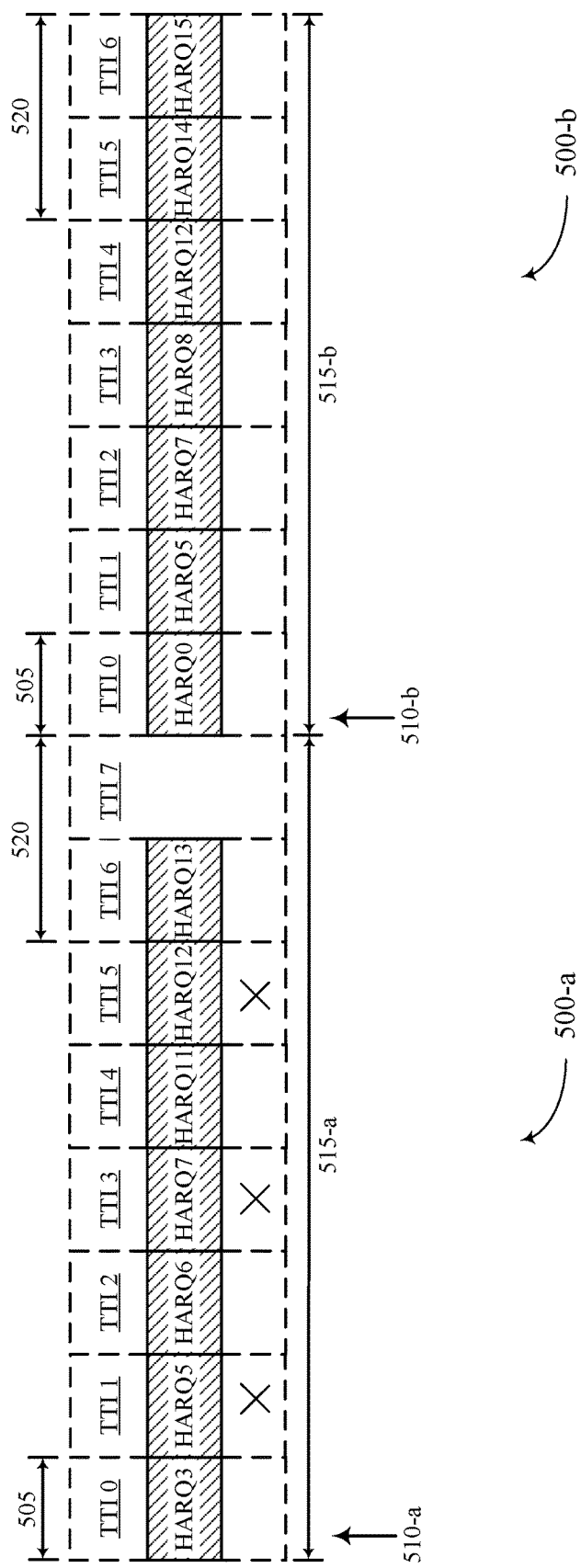
FIG. 5 illustrates an example of acknowledgement feedback messaging that supports HARQ feedback and multi-TTI scheduling in accordance with various aspects of the present disclosure.

FIG. 5 illustrates an example of acknowledgement/negative-acknowledgement (ACK/NACK) communication associated with a first data burst 500-*a* and a second data burst 500-*b* between a base station 105 and a UE 115, in accordance with various aspects of the present disclosure. In this example, a first multi-TTI grant 510-*a* transmitted in the first data burst 500-*a* is described that includes information for HARQ processes in the seven TTIs 505 included in TTI group 515-*a*. A second multi-TTI grant 510-*b* transmitted in a subsequent data burst 500-*b* is described that includes information for HARQ processes in the seven TTIs 505 included in TTI group 515-*b*.

In this example, a base station 105 may transmit a multi-TTI grant 510-*a* that includes information associated with HARQ processes for the seven TTIs 505 (e.g., TTI group 515-*a*) included in the multi-TTI grant 510-*a*. As described above, the multi-TTI grant 510-*a* may include a HARQ process bitmap indicating the identity and total number of the HARQ processes associated with the TTI group 515-*a*. In this example, the HARQ process bitmap may indicate that HARQ process identifiers HARQ3, HARQ5, HARQ6, HARQ7, HARQ11, HARQ12, and HARQ13 are included in the multi-TTI grant 510-*a*. As shown, the UE 115 may decode HARQ processes with identifiers HARQ3, HARQ6, and HARQ11, but may fail to decode HARQ process identifiers HARQ5, HARQ7, and HARQ12 (denoted by X marks).

In some examples, the UE 115 may transmit an acknowledgement message at the end of the data burst 500-*a* to the base station 105 indicating which HARQ process identifiers were properly decoded (e.g., an ACK) and which ones were not properly decoded (e.g., a NACK). However, for TTIs 505 that are near the end of the data burst 500-*a*, the UE 115 may not have had sufficient time to attempt to decode the data. As such, by the time the ACK/NACK procedure begins, the UE 115 may not yet have determined if the data associated with HARQ processes near the end of the data burst 500-*a* were properly decoded or not.

As such, in some examples, UE 115 and/or base station 105 may determine a back-off time 520 from the end of the data burst 500-*a*. This back-off time may be measured in TTI units and may be a parameter that is controlled or manipulated by either the base station 105 or the UE 115. The back-off time 520 may represent a sufficient duration for a UE 115 to decode data transmitted in the previous TTIs 505. In some cases, base station 105 may purposefully schedule a certain number of TTIs towards the end of a data burst 500-*a* to a different UE 115 than the UE 115 receiving the multi-TTI grant 510-*a*, which may in effect build in a back-off time 520 for the UE 115 to process the data. For example, in data burst 500-*a*, TTI 7 is scheduled to some other UE 115. In this example, the back-off time 520 is a duration of two TTIs 505.

The acknowledgement message that the UE 115 transmits at the end of the data burst 500-*a* may include an ACK/NACK bitmap that includes one (1) bits at locations within the bitmap corresponding with HARQ process identifiers that were properly decoded and zero (0) bits at locations within the bitmap corresponding with HARQ process identifiers that were not properly decoded. The ACK/NACK bitmap may have a fixed length corresponding to the maximum number of unique HARQ process identifiers assigned by a base station 105 for a particular communications link. Also, for TTIs 505 that are within the back-off time 520 (e.g., TTI 6 and TTI 7), the UE 115 may indicate that the data associated with these TTIs was received, but not yet decoded. The UE 115 may indicate that a particular HARQ process identifier was received but not yet decoded by including a one (1) bit in the bitmap location corresponding to that HARQ process identifier. Because the base station 105 may be aware of the back-off time 520, the base station 105 may interpret a one (1) bit in a location corresponding to a HARQ process identifier within the back-off time 520 as being received by the UE 115 but not yet decoded. As such, the base station 105 may refrain from reusing that particular HARQ process identifier until it receives (e.g., in a later communication from the UE 115) an additional ACK or NACK that indicates that the UE 115 has either decoded or failed to decode the corresponding data.

For example, the ACK/NACK bitmap for data burst 500-*a* may be "0001001000010100." This ACK/NACK bitmap may indicate that HARQ process identifiers HARQ3, HARQ6 and HARQ11 were received by the UE 115 and successfully decoded. Additionally, this ACK/NACK bitmap may indicate that HARQ process identifiers HARQ5, HARQ7, and HARQ12 were received by the UE 115 but not successfully decoded. Because HARQ process identifier HARQ13 is in a TTI 505 within the back-off time 520, the UE 115 may not have had sufficient time to decode this HARQ process. Accordingly, the UE 115 may indicate with a one (1) bit in the ACK/NACK bitmap that HARQ process identifier HARQ13 was received but that the UE 115 has not yet had sufficient time to decode this process.

After receiving the ACK/NACK bitmap associated with data burst 500-*a*, a base station 105 may transmit a subsequent data burst 500-*b* that includes a multi-TTI grant 510-*b*. The multi-TTI grant 510-*b* may include information associated with the multiple TTIs 505 included in the multi-TTI grant 510-*b* (e.g., TTI group 515-*b*). The multi-TTI grant 510-*b* may include new HARQ processes as well as a retransmission of HARQ process identifiers HARQ5, HARQ7, and HARQ12, which were the HARQ processes that the UE 115 failed to decode in the previous data burst 500-*a*. However, because the base station 105 may still be waiting for an affirmative ACK or NACK regarding HARQ process identifier HARQ13, the base station 105 may refrain from selecting HARQ process identifier HARQ13 for transmission in data burst 500-*b*.

After the data burst 500-*b*, the UE 115 may transmit an acknowledgment message, including an ACK/NACK bitmap, to the base station 105 indicating which HARQ process identifiers of the data burst 500-*b* were successfully decoded and which ones were not successfully decoded. As such, the ACK/NACK bitmap may be, for example, "1000010110001111." In this example, a base station 105 may interpret from the ACK/NACK bitmap that HARQ process identifiers HARQ0, HARQ5, HARQ7, HARQ8 and HARQ12 were received and successfully decoded. Also, since there is a one (1) bit in the bitmap location corresponding to HARQ process identifier HARQ13, the base station 105 may interpret that HARQ13 from the previous data burst 500-*a* was eventually successfully decoded. As such, the base station 105 may now be free to reuse HARQ process identifier HARQ13 for new data in subsequent data bursts. Also, because HARQ process identifiers HARQ14 and HARQ15 are within TTIs 505 within the back-off time 520 (e.g., TTI 6 and TTI 7) the base station 105 may interpret the one (1) bits in the ACK/NACK bitmap corresponding to these processes as the UE 115 received HARQ14 and HARQ15, but that the UE 115 has not yet had sufficient time to decode these processes.

Figure 6:
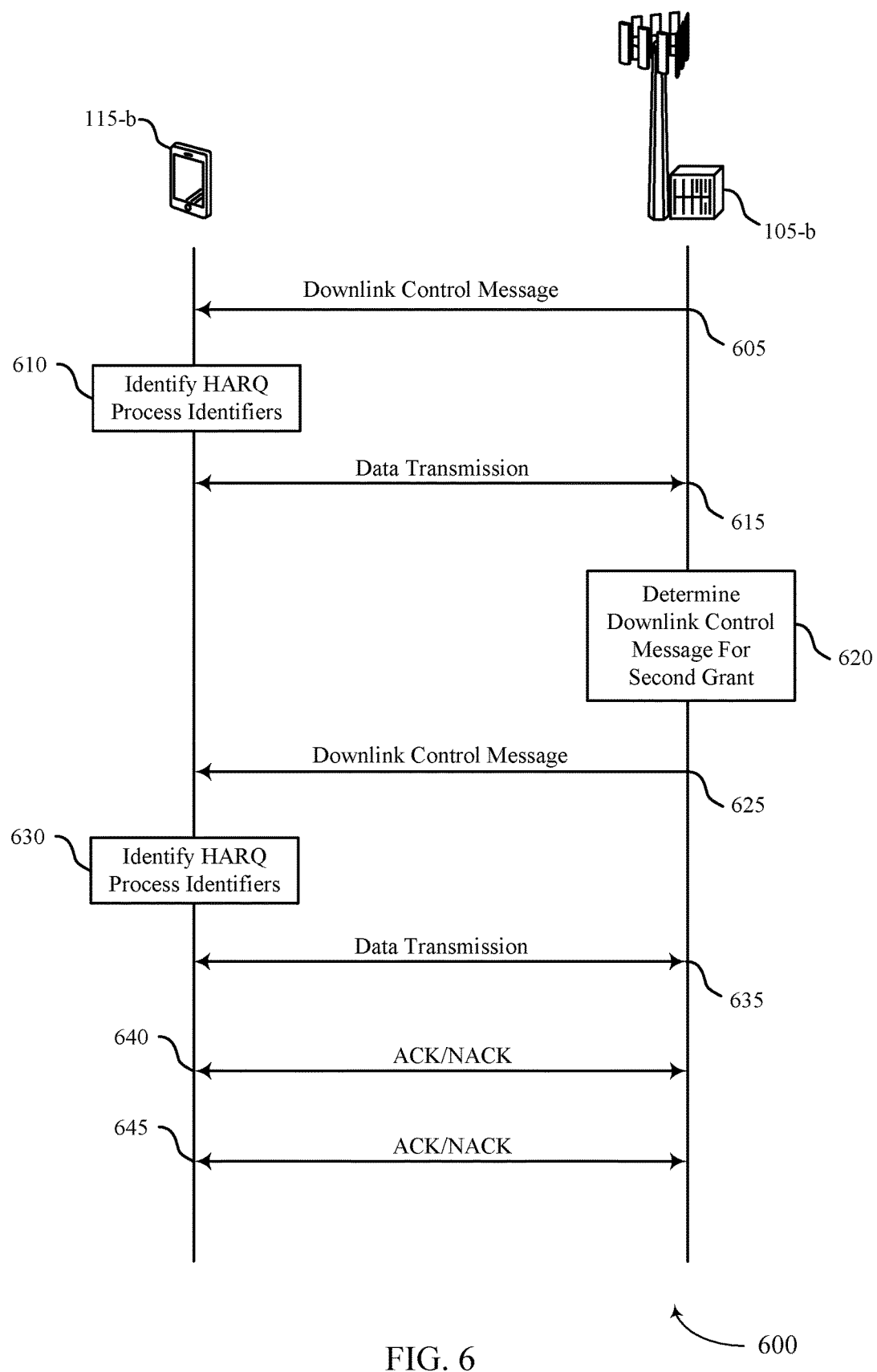
FIG. 6 illustrates an example of a process flow that supports HARQ feedback and multi-TTI scheduling in accordance with various aspects of the present disclosure.

FIG. 6 illustrates an example of a process flow 600 that supports multi-TTI grants and dynamic ACK/NACK communication in accordance with various aspects of the present disclosure. Process flow 600 may include a UE 115-*b* and base station 105-*b*, which may be examples of a UE 115 and a base station 105 described with reference to FIGS. 1-2.

At step 605, base station 105-*b* may transmit and UE 115-*b* may receive a first downlink control message that includes a first grant (e.g., uplink or downlink grant) for resources for one or more TTIs (e.g., a multi-TTI grant). In some examples, at least two TTIs of the one or more TTIs may be associated with different HARQ processes. In some cases, each TTI of the TTIs of the one or more TTIs may be associated with a different HARQ process.

Base station 105-*b* and UE 115-*b* may communicate to determine a transmission order for the one or more HARQ process identifiers. In some cases, base station 105-*b* or UE 115-*b* may agree to order the one or more HARQ process identifiers in ascending order, descending order, or any other deterministic order. Additionally, base station 105-*b* or UE 115-*b* may agree to order HARQ process identifiers associated with new data transmissions first followed by HARQ process identifiers associated with retransmission data, or vice versa.

At step 610, the UE 115-*b* may identify, one or more HARQ process identifiers associated with one or more TTIs in the downlink control message indicated by the base station 105-*b*. Identifying the HARQ process identifiers may include identifying a bitmap that indicates the one or more HARQ process identifiers associated with the first multiple TTIs. In some examples, the bitmap may include a first value at each bit location that corresponds to each HARQ process identifier of the one or more HARQ process identifiers associated with the first multiple TTIs. The bitmap may also include a second value at each bit location that corresponds to HARQ process identifiers that are unassociated with the first multiple TTIs. UE 115-*b* may determine a total number of the first multiple TTIs based on a total number of occurrences of the first value included in the bitmap.

The base station 105-*b* may indicate, and the UE 115-*b* may identify, one or more system configurations associated with the first multiple TTIs in the first downlink control message. In some cases, the one or more system configurations may apply to each TTI of the first multiple TTIs. In some examples, the one or more system configurations associated with the first multiple TTIs may be an MCS, rank, RB allocation, and the like.

UE 115-*b* may also identify an NDI associated with the first multiple TTIs in the first downlink control message indicated by the base station 105-*b*. In some cases, UE 115-*b* may decode an NDI bitmap to identify the NDI associated with the first multiple TTIs. The NDI bitmap may include a number of bits that is equal to a total number of the first multiple TTIs. Additionally or alternatively, an NDI bitmap may include a length that is based on a maximum transmission opportunity of a data burst associated with the first multiple TTIs. In yet other examples, a length of the NDI bitmap may be equal to a length of a bitmap indicative of the plurality of HARQ process identifiers associated with the first plurality of TTIs (e.g., a HARQ process bitmap).

At step 615, base station 105-*b* and UE 115-*b* may communicate using the resources of at least one TTI of the first multiple TTIs according to the HARQ process for at least one TTI. In some cases, the communication may be based on the HARQ process identifier of the HARQ process of the at least one TTI. The data transmissions associated with the HARQ process identifiers may be new data transmissions or retransmissions of previous data. In the case of an uplink grant, UE 115-*b* may perform a CCA and encode data for transmission on the uplink resources. UE 115-*b* may then transmit a portion of the data on the uplink resources based on the duration of a delay associated with CCA. At step 620, base station 105-*b* may determine to transmit a downlink control message for a second grant of resources for a second group of TTIs. The second grant may be a subsequent, non-overlapping grant, a retransmission of a previous grant, or an overwriting grant.

At step 625, base station 105-*b* may transmit and UE 115-*b* may receive a second downlink control message. In the case of a subsequent non-overlapping grant, the second downlink control message may be sent after the TTIs associated with the first grant and may include a second grant for resources for a second multiple TTIs. The second grant for resources may differ from the first grant for resources (e.g., different MCS, RB allocation, rank). In the case of a retransmission, the second grant may be sent during one of the TTIs associated with the first grant, but may be the same as the first grant, which may increase the likelihood that portions of the first grant are successfully decoded. In the case of an overwriting grant, the second grant may be sent during one of the TTIs associated with the first grant, and may change one or more control or assignment configurations of the first grant (e.g., different MCS, RB allocation, rank). In some cases, a UE 115-*b* may treat any second grant as an overwriting grant.

In some cases, UE 115-*b* may compare the one or more system configurations associated with the first grant with one or more system configurations associated with the second grant. If the system configurations are the same between the two grants, UE 115-*b* may then determine that the second downlink control message is a retransmission of the first downlink control message. If the system configurations differ between the two grants, UE 115-*b* may then determine that the second downlink control message is an overwrite of the first downlink control message.

At step 630, UE 115-*b* may identify one or more HARQ process identifiers associated with the second multiple TTIs in the second downlink control message. In some cases, the one or more HARQ process identifiers associated with the second multiple TTIs may be different from the one or more HARQ process identifiers associated with the first multiple TTIs. UE 115-*b* may identify one or more system configurations associated with the second multiple TTIs from the second downlink control message. In some cases, the one or more system configurations may apply to each TTI of the second multiple TTIs. Additionally, the system configurations associated with the second multiple TTIs may be different from the system configurations associated with the first multiple TTIs. In some examples, the one or more system configurations associated with the second multiple TTIs may be an MCS, rank, RB allocation, and the like.

UE 115-*b* may decode a bitmap from the second downlink control message that identifies a subset of the multiple HARQ process identifiers that are associated with the TTI that the second downlink control message was received in and subsequent TTIs of the first multiple TTIs. At step 635, base station 105-*b* and UE 115-*b* may communicate using the resources of at least one TTI of the multiple TTIs associated with the second grant. In some cases, the communication may be based on the HARQ process identifier of the HARQ process of the at least one TTI of the second multiple TTIs.

In some cases, the base station 105-*b* and UE 115-*b* communicate acknowledgment feedback to indicate whether data has been successfully decoded or not. Also, in some cases, acknowledgement feedback may indicate that data was received, but that sufficient time has not yet elapsed to determine if the data was successfully decoded. UE 115-*b* may communicate the acknowledgement/negative-acknowledgement using an ACK/NACK bitmap. Before transmitting ACK/NACK feedback, UE 115-*b* may identify a subset of the multiple TTIs that are within a predetermined number of TTIs from the end of a data burst associated with the multiple TTIs. This back-off time may be a predetermined configuration or may be dynamically negotiated between the base station 105-*b* and UE 115-*b*.

At 640, UE 115-*b* may then transmit a first ACK message associated with at least one TTI of the subset of TTIs within the back-off time. In some cases, the first ACK message may indicate that data associated with certain HARQ process identifiers within the back-off time was received and not yet decoded. At 645, after receiving a second downlink communication from base station 105-*b*, UE 115-*b* may transmit a second ACK message associated with at least one of the TTIs that was associated with the first ACK message. In some cases, the second ACK message may indicate that the data associated with the first grant was successfully decoded. In other cases, the second ACK message may indicate that the data associated with the first grant was not successfully decoded.

Figure 7:
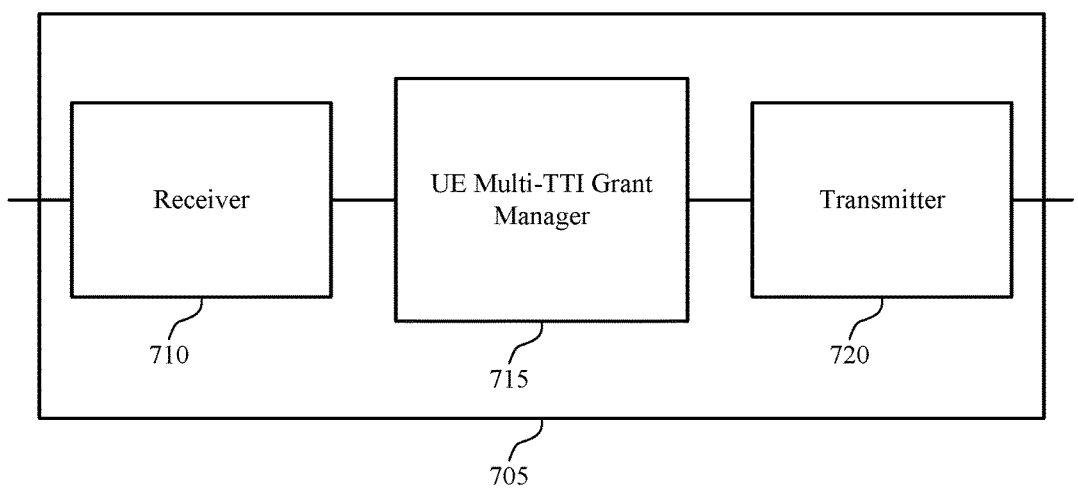
FIGS. 7 through 9 show diagrams of a device or devices that support HARQ feedback and multi-TTI scheduling in accordance with various aspects of the present disclosure.

FIG. 7 shows a diagram 700 of a wireless device 705 that supports multi-TTI grant for HARQ feedback in accordance with various aspects of the present disclosure. Wireless device 705 may be an example of aspects of a UE 115 as described with reference to FIG. 1. Wireless device 705 may include receiver 710, UE multi-TTI grant manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to multi-TTI grant for HARQ feedback, etc.). Information may be passed on to other components of the device. The receiver 710 may be an example of aspects of the transceiver 1035 described with reference to FIG. 10.

Receiver 710 may receive a first downlink control message that includes a first grant for resources for a first set of TTIs, where at least two TTIs of the first set of TTIs are associated with different HARQ processes, receive a second downlink control message subsequent to the first set of TTIs, the second downlink control message including a second grant for resources for a second set of TTIs, receive a second downlink control message in one of the first set of TTIs, where the second downlink control message is a retransmission of the first downlink control message, and receive a second downlink control message in one of the first set of TTIs, where the second downlink control message at least partially overwrites the first downlink control message. In some cases, the first grant for resources includes an assignment of uplink resources.

UE multi-TTI grant manager 715 may be an example of aspects of the UE multi-TTI grant manager 1015 described with reference to FIG. 10. UE multi-TTI grant manager 715 may identify in the first downlink control message a set of HARQ process identifiers associated with the first set of TTIs. The UE multi-TTI grant manager 715 may also identify a subset of the first set of TTIs that are within a predetermined number of TTIs from the end of a data burst associated with the first set of TTIs and transmit a first ACK message associated with at least one of the TTIs of the subset of TTIs, where the first ACK message indicates that the HARQ processes associated with the at least one TTI of the subset of TTIs was received and not yet decoded.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may include a single antenna, or it may include a set of antennas.

Transmitter 720 may communicate using the resources of at least one TTI of the first set of TTIs according to the HARQ process for the at least one TTI and based on the HARQ process identifier of the HARQ process of the at least one TTI and may transmit a portion of the data on the uplink resources, where the portion of the data transmitted on the uplink resources is based on a duration of a delay associated with a CCA.

Figure 8:
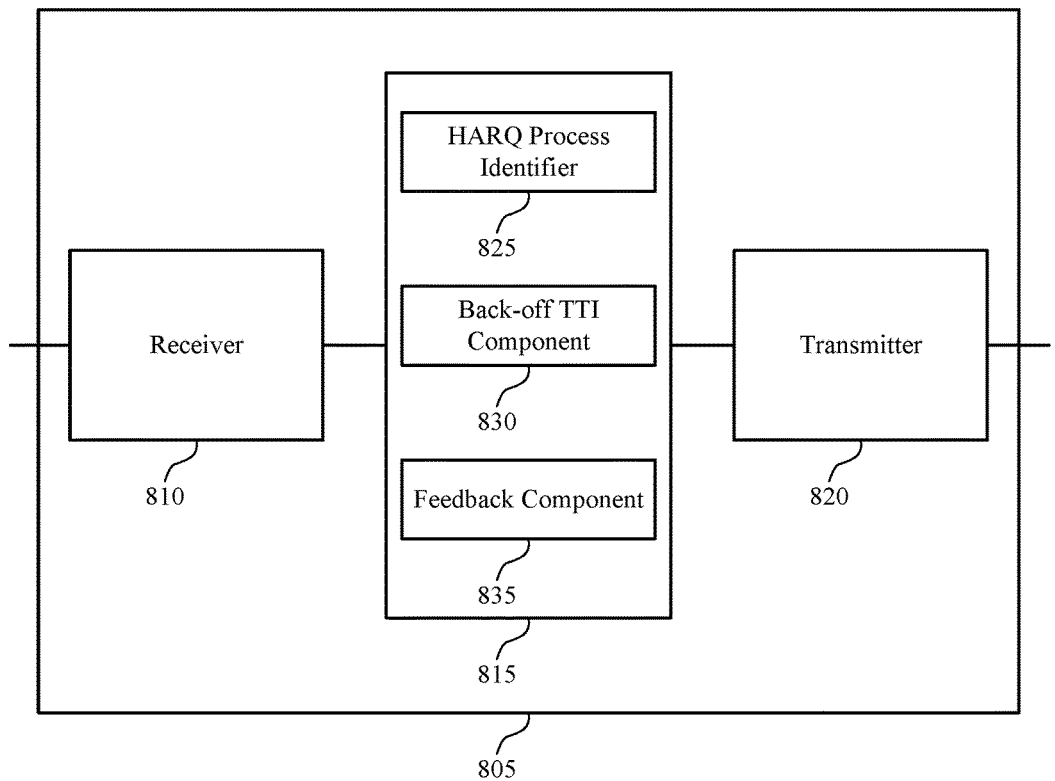

FIG. 8 shows a diagram 800 of a wireless device 805 that supports multi-TTI grant for HARQ feedback in accordance with various aspects of the present disclosure. Wireless device 805 may be an example of aspects of a wireless device 705 or a UE 115 as described with reference to FIGS. 1 and 7. Wireless device 805 may include receiver 810, UE multi-TTI grant manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to multi-TTI grant for HARQ feedback, etc.). Information may be passed on to other components of the device. The receiver 810 may be an example of aspects of the transceiver 1035 described with reference to FIG. 10.

UE multi-TTI grant manager 815 may be an example of aspects of the UE multi-TTI grant manager 1015 described with reference to FIG. 10. UE multi-TTI grant manager 815 may include HARQ process identifier 825, back-off TTI component 830, and feedback component 835.

HARQ process identifier 825 may identify in the first downlink control message a set of HARQ process identifiers associated with the first set of TTIs, determine a total number of the first set of TTIs based on a total number of occurrences of a first value included in a bitmap in the first downlink control message, identify in the second downlink control message a set of HARQ process identifiers associated with the second set of TTIs, and decode from the second downlink control message a bitmap that identifies a subset of the set of HARQ process identifiers that are associated with the TTI that the second downlink control message was received in and subsequent TTIs of the first set of TTIs. In some cases, each TTI of the TTIs of the first set of TTIs is associated with a different HARQ process identifier.

In some cases, identifying the set of HARQ process identifiers associated with the first set of TTIs includes identifying a bitmap indicative of the set of HARQ process identifiers associated with the first set of TTIs. In some cases, the bitmap includes a first value at each bit location that corresponds to each HARQ process identifier of the set of HARQ process identifiers associated with the first set of TTIs, and the bitmap includes a second value at each bit location that corresponds to HARQ process identifiers that are unassociated with the first set of TTIs. In some cases, the set of HARQ process identifiers associated with the second set of TTIs are different from the set of HARQ process identifiers associated with the first set of TTIs. In some cases, the set of HARQ process identifiers associated with the second set of TTIs are the same as the set of HARQ process identifiers associated with the first set of TTIs.

Back-off TTI component 830 may identify a subset of the first set of TTIs that are within a predetermined number of TTIs from the end of a data burst associated with the first set of TTIs. The back-off time identified by the back-off TTI component 830 may be preconfigured by a base station 105 or UE 115 and/or may be dynamically selected by a base station 105 or UE 115. In some examples, the back-off time is selected to ensure that a UE 115 has sufficient time to decode data in TTIs before the back-off time so that the UE 115 may provide an affirmative ACK message to the base station 105. In some cases, the back-off time is two TTIs in duration.

Feedback component 835 may transmit a first ACK message associated with at least one of the TTIs of the subset of TTIs, where the first ACK message indicates that the HARQ processes associated with the at least one TTI of the subset of TTIs was received and not yet decoded, transmit a second ACK message associated with the at least one of the TTIs that was associated with the first ACK message, where the second ACK message indicates that the HARQ processes associated with the at least one TTI of the subset of TTIs was successfully decoded, and transmit a second ACK message associated with the at least one of the TTIs that was associated with the first ACK message, where the second ACK message indicates that the HARQ processes associated with the at least one TTI of the subset of TTIs was not successfully decoded.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may include a single antenna, or it may include a set of antennas.

Figure 9:
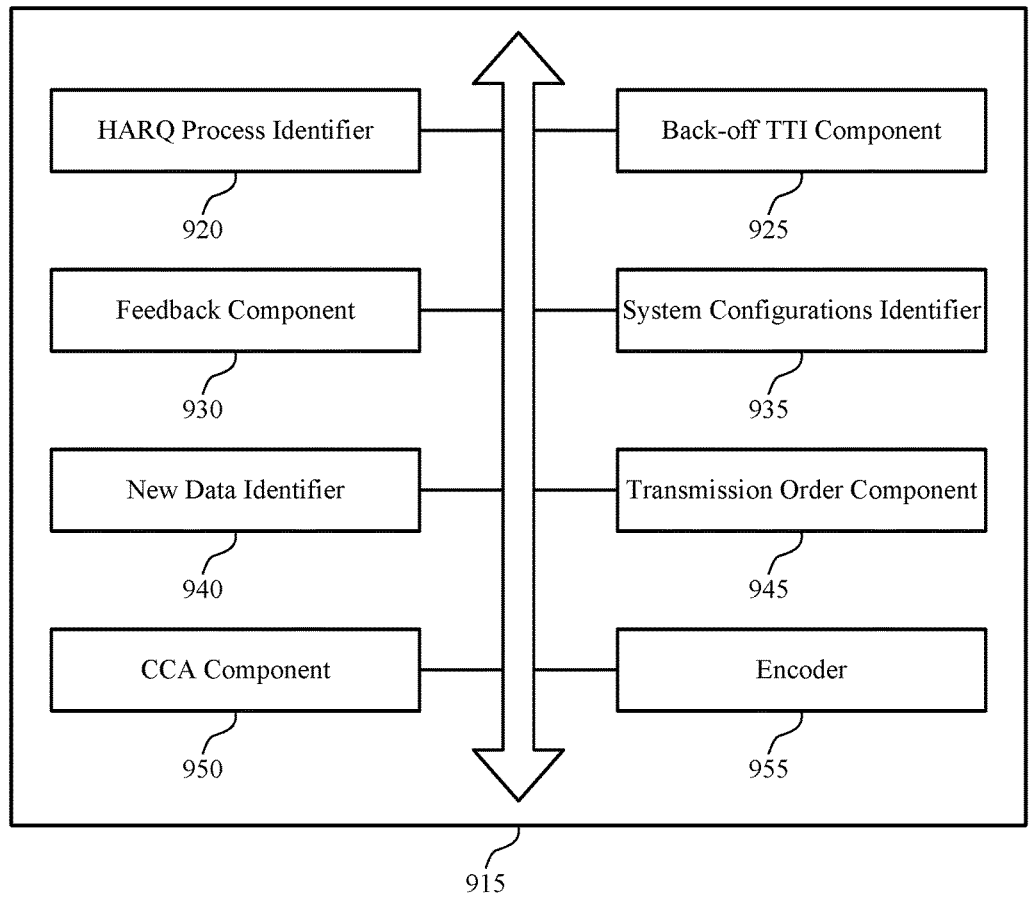

FIG. 9 shows a diagram 900 of a UE multi-TTI grant manager 915 that supports multi-TTI grant for HARQ feedback in accordance with various aspects of the present disclosure. The UE multi-TTI grant manager 915 may be an example of aspects of a UE multi-TTI grant manager 715, a UE multi-TTI grant manager 815, or a UE multi-TTI grant manager 1015 described with reference to FIGS. 7, 8, and 10. The UE multi-TTI grant manager 915 may include HARQ process identifier 920, back-off TTI component 925, feedback component 930, system configurations identifier 935, new data identifier 940, transmission order component 945, CCA component 950, and encoder 955. Each of these modules may communicate, directly or indirectly, with one another (e.g., via one or more buses).

HARQ process identifier 920 may identify in the first downlink control message a set of HARQ process identifiers associated with the first set of TTIs, determine a total number of the first set of TTIs based on a total number of occurrences of a first value included in a bitmap in the first downlink control message, identify in the second downlink control message a set of HARQ process identifiers associated with the second set of TTIs, and decode from the second downlink control message a bitmap that identifies a subset of the set of HARQ process identifiers that are associated with the TTI that the second downlink control message was received in and subsequent TTIs of the first set of TTIs. In some cases, each TTI of the TTIs of the first set of TTIs is associated with a different HARQ process identifier.

In some cases, identifying the set of HARQ process identifiers associated with the first set of TTIs includes identifying a bitmap indicative of the set of HARQ process identifiers associated with the first set of TTIs. In some cases, the bitmap includes a first value at each bit location that corresponds to each HARQ process identifier of the set of HARQ process identifiers associated with the first set of TTIs, and the bitmap includes a second value at each bit location that corresponds to HARQ process identifiers that are unassociated with the first set of TTIs. In some cases, the set of HARQ process identifiers associated with the second set of TTIs are different from the set of HARQ process identifiers associated with the first set of TTIs. In some cases, the set of HARQ process identifiers associated with the second set of TTIs are the same as the set of HARQ process identifiers associated with the first set of TTIs.

Back-off TTI component 925 may identify a subset of the first set of TTIs that are within a predetermined number of TTIs from the end of a data burst associated with the first set of TTIs. Feedback component 930 may transmit a first ACK message associated with at least one of the TTIs of the subset of TTIs, where the first ACK message indicates that the HARQ processes associated with the at least one TTI of the subset of TTIs was received and not yet decoded, transmit a second ACK message associated with the at least one of the TTIs that was associated with the first ACK message, where the second ACK message indicates that the HARQ processes associated with the at least one TTI of the subset of TTIs was successfully decoded, and transmit a second ACK message associated with the at least one of the TTIs that was associated with the first ACK message, where the second ACK message indicates that the HARQ processes associated with the at least one TTI of the subset of TTIs was not successfully decoded.

System configurations identifier 935 may identify in the first downlink control message one or more system configurations associated with the first set of TTIs, where the one or more system configurations apply to each TTI of the first set of TTIs, identify in the second downlink control message one or more system configurations associated with the second set of TTIs, where the one or more system configurations associated with the second set of TTIs apply to each TTI of the second set of TTIs, and where at least one of the one or more system configurations associated with the second set of TTIs is different from at least one of the one or more system configurations associated with the first set of TTIs, identify in the second downlink control message one or more system configurations associated with the first set of TTIs, where the one or more system configurations identified in the first downlink control message are the same as the one or more system configurations identified in the second downlink control message, and identify in the second downlink control message one or more system configurations associated with the first set of TTIs, where at least one of the one or more system configurations identified in the first downlink control message is different than at least one of the one or more system configurations identified in the second downlink control message.

In some cases, the one or more system configurations associated with the first set of TTIs include at least one of an MCS, a rank, an RB allocation, or any combination thereof. In some cases, the one or more system configurations associated with the first set of TTIs and the one or more system configurations associated with the second set of TTIs include at least one of an MCS, a rank, an RB allocation, or any combination thereof.

New data identifier 940 may identify in the first downlink control message an NDI associated with the first set of TTIs, where identifying the NDI associated with the first set of TTIs includes decoding an NDI bitmap. In some cases, the NDI bitmap includes a length that is equal to a total number of the first set of TTIs. In some cases, the NDI bitmap includes a length that is based on a maximum transmission opportunity of a data burst associated with the first set of TTIs. In some cases, the NDI bitmap includes a length that is equal to a length of a bitmap indicative of the set of HARQ process identifiers associated with the first set of TTIs.

Transmission order component 945 may determine a transmission order for the set of HARQ process identifiers. In some cases, the transmission order component 945 may order the set of HARQ process identifiers in numerically ascending order, numerically descending order, or any other deterministic order. Additionally or alternatively, the transmission order component 945 may order HARQ process identifiers associated with new data transmissions before HARQ process identifiers associated with retransmissions, or vice versa.

CCA component 950 may perform a CCA. In some cases, the CCA component 950 may perform an eCCA. Encoder 955 may encode data for transmission on some uplink resources. As described above, encoder 955 may encode data while the CCA component 950 is performing a CCA such that when the CCA passes, a UE 115 may transmit the encoded data during the TTI that the CCA passed, which may alleviate the need to re-encode data after passing the CCA.

Figure 10:
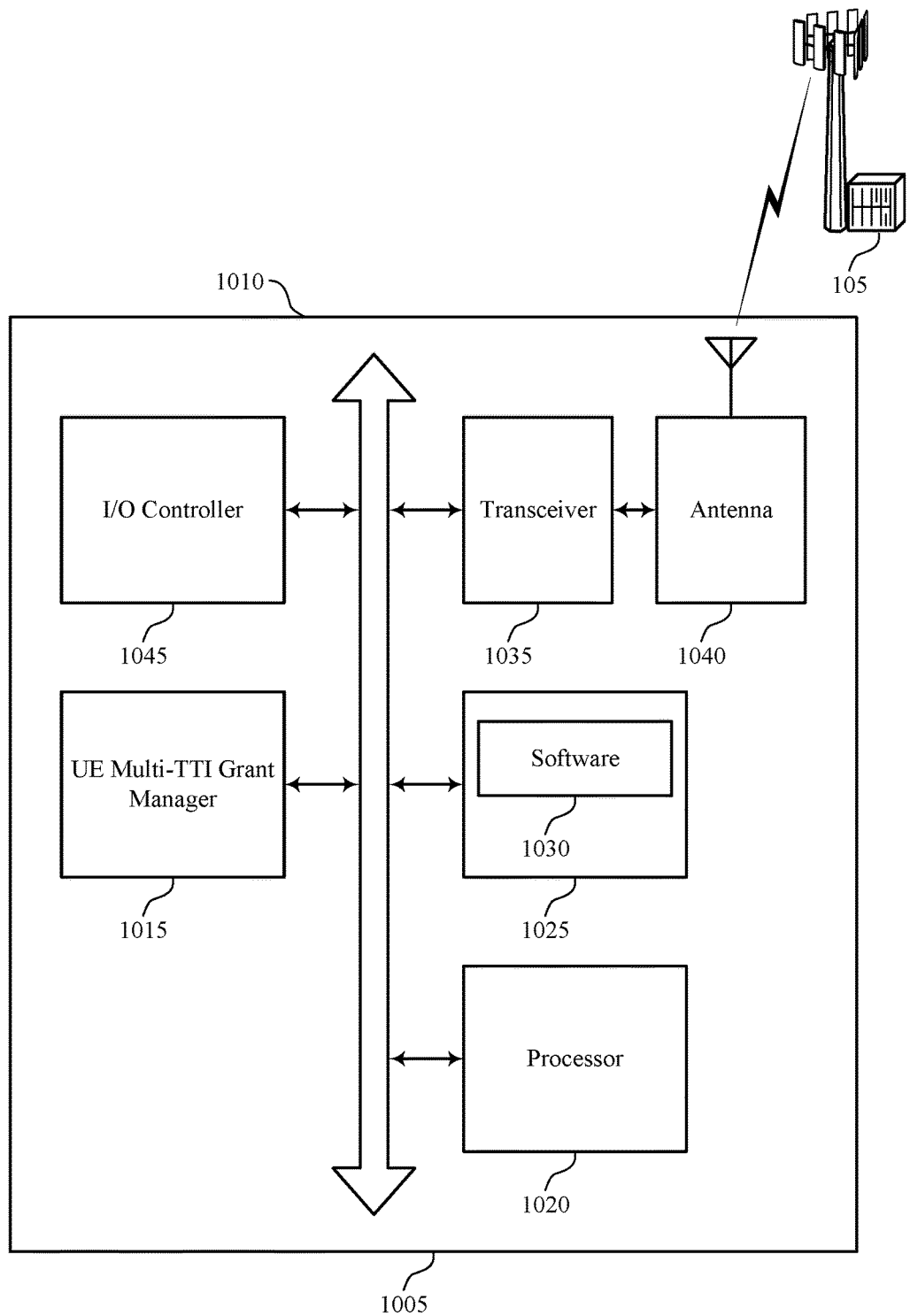
FIG. 10 illustrates a diagram of a system including a device that supports HARQ feedback and multi-TTI scheduling in accordance with various aspects of the present disclosure.

FIG. 10 shows a diagram of a system 1000 including a device 1005 that supports multi-TTI grant for HARQ feedback in accordance with various aspects of the present disclosure. Device 1005 may be an example of or include the components of wireless device 705, wireless device 805, or a UE 115 as described above, e.g., with reference to FIGS. 1, 7 and 8. Device 1005 may include components for bi-directional voice and data communications including components for transmitting and receiving communications, including UE multi-TTI grant manager 1015, processor 1020, memory 1025, software 1030, transceiver 1035, antenna 1040, and I/O controller 1045. These components may be in electronic communication via one or more busses (e.g., bus 1010). Device 1005 may communicate wirelessly with one or more base stations 105.

Processor 1020 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof).

In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting HARQ feedback and multi-TTI scheduling).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a Basic Input-Output system (BIOS) which may control basic hardware and/or software operation such as the interaction with peripheral components or devices.

Software 1030 may include code to implement aspects of the present disclosure, including code to support multi-TTI grant for HARQ feedback. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas. In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system.

Figure 11:
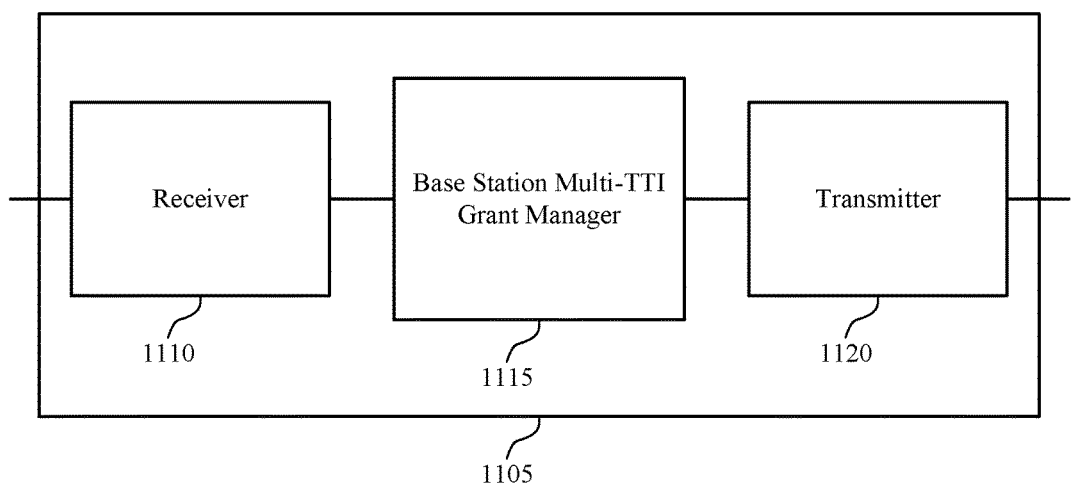
FIGS. 11 through 13 show diagrams of a device or devices that support HARQ feedback and multi-TTI scheduling in accordance with various aspects of the present disclosure.

FIG. 11 shows a diagram 1100 of a wireless device 1105 that supports multi-TTI grant for HARQ feedback in accordance with various aspects of the present disclosure. Wireless device 1105 may be an example of aspects of a base station 105 as described with reference to FIG. 1. Wireless device 1105 may include receiver 1110, base station multi-TTI grant manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to HARQ feedback and multi-TTI scheduling, etc.). Information may be passed on to other components of the device. The receiver 1110 may be an example of aspects of the transceiver 1435 described with reference to FIG. 14. Receiver 1110 may communicate using the resources of at least one TTI of a first set of TTIs according to a HARQ process for at least one TTI and based on a HARQ process identifier of the HARQ process of the at least one TTI.

Base station multi-TTI grant manager 1115 may be an example of aspects of the base station multi-TTI grant manager 1415 described with reference to FIG. 14. Base station multi-TTI grant manager 1115 may indicate in the first downlink control message a set of HARQ process identifiers associated with the first set of TTIs. The base station multi-TTI grant manager 1115 may also identify a subset of the first set of TTIs that are within a predetermined number of TTIs from the end of a data burst associated with the first set of TTIs and receive a first ACK message associated with at least one of the TTIs of the subset of TTIs, where the first ACK message indicates that the HARQ processes associated with the at least one TTI of the subset of TTIs was received and not yet decoded.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may include a single antenna, or it may include a set of antennas.

Transmitter 1120 may transmit a first downlink control message that includes a first grant for resources for a first set of TTIs, where at least two TTIs of the first set of TTIs are associated with different HARQ processes, transmit a second downlink control message subsequent to the first set of TTIs, the second downlink control message including a second grant for resources for a second set of TTIs, transmit a second downlink control message in one of the first set of TTIs, where the second downlink control message is a retransmission of the first downlink control message, and transmit a second downlink control message in one of the first set of TTIs, where the second downlink control message at least partially overwrites the first downlink control message.

Figure 12:
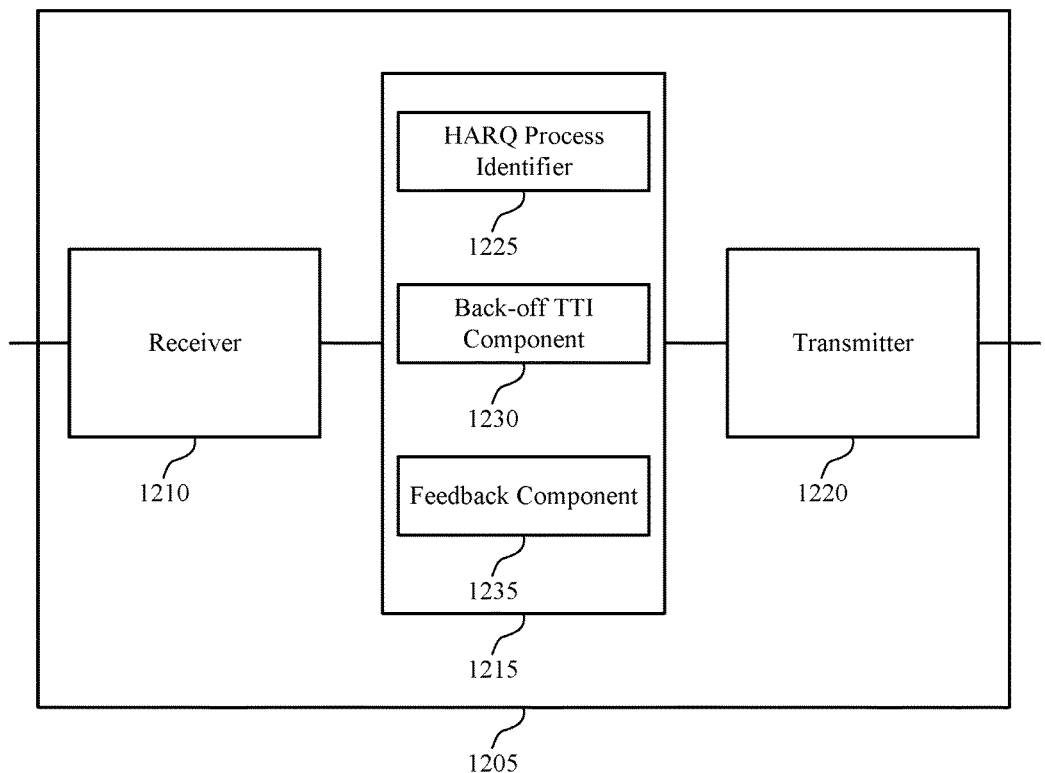

FIG. 12 shows a diagram 1200 of a wireless device 1205 that supports HARQ feedback and multi-TTI scheduling in accordance with various aspects of the present disclosure. Wireless device 1205 may be an example of aspects of a wireless device 1105 or a base station 105 as described with reference to FIGS. 1 and 11. Wireless device 1205 may include receiver 1210, base station multi-TTI grant manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to HARQ feedback and multi-TTI scheduling, etc.). Information may be passed on to other components of the device. The receiver 1210 may be an example of aspects of the transceiver 1435 described with reference to FIG. 14.

Base station multi-TTI grant manager 1215 may be an example of aspects of the base station multi-TTI grant manager 1415 described with reference to FIG. 14. Base station multi-TTI grant manager 1215 may include HARQ process identifier 1225, back-off TTI component 1230, and feedback component 1235.

HARQ process identifier 1225 may indicate in the first downlink control message a set of HARQ process identifiers associated with the first set of TTIs and indicate in the second downlink control message a set of HARQ process identifiers associated with the second set of TTIs. In some cases, each TTI of the TTIs of the first set of TTIs is associated with a different HARQ process identifier. In some cases, indicating the set of HARQ process identifiers associated with the first set of TTIs includes transmitting a bitmap indicative of the set of HARQ process identifiers associated with the first set of TTIs. In some cases, the bitmap includes a first value at each bit location that corresponds to each HARQ process identifier of the set of HARQ process identifiers associated with the first set of TTIs, and the bitmap includes a second value at each bit location that corresponds to HARQ process identifiers that are unassociated with the first set of TTIs.

Back-off TTI component 1230 may identify a subset of the first set of TTIs that are within a predetermined number of TTIs from the end of a data burst associated with the first set of TTIs. Feedback component 1235 may receive a first ACK message associated with at least one of the TTIs of the subset of TTIs, where the first ACK message indicates that the HARQ processes associated with the at least one TTI of the subset of TTIs was received and not yet decoded and receive a second ACK message associated with the at least one of the TTIs that was associated with the first ACK message, where the second ACK message indicates that the data associated with the HARQ process identifier associated with the at least one TTI was successfully decoded.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may include a single antenna, or it may include a set of antennas.

Figure 13:
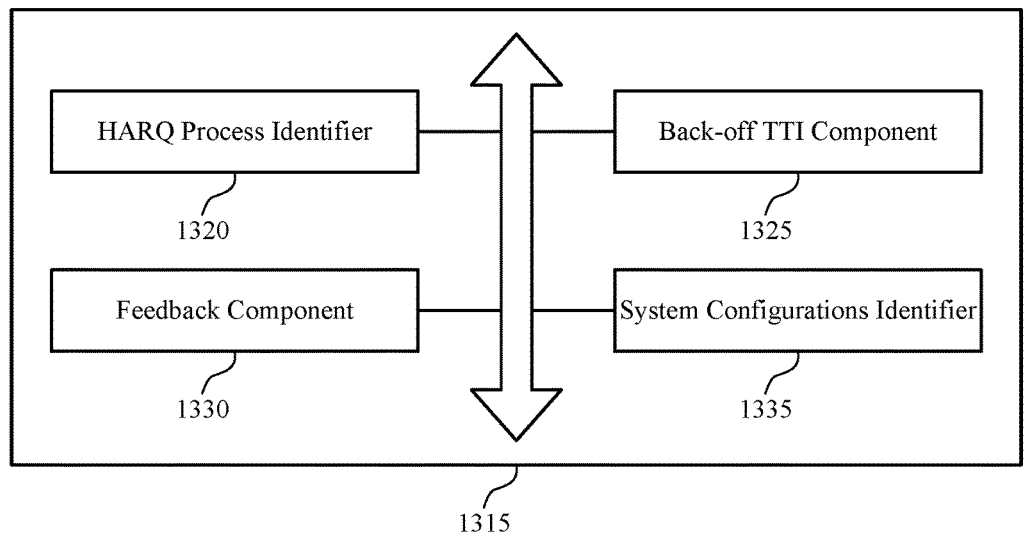

FIG. 13 shows a diagram 1300 of a base station multi-TTI grant manager 1315 that supports multi-TTI grant for HARQ feedback in accordance with various aspects of the present disclosure. The base station multi-TTI grant manager 1315 may be an example of aspects of a base station multi-TTI grant manager 1415 described with reference to FIGS. 11, 12, and 14. The base station multi-TTI grant manager 1315 may include HARQ process identifier 1320, back-off TTI component 1325, feedback component 1330, and system configurations identifier 1335. Each of these modules may communicate, directly or indirectly, with one another (e.g., via one or more buses).

HARQ process identifier 1320 may indicate in the first downlink control message a set of HARQ process identifiers associated with the first set of TTIs and indicate in the second downlink control message a set of HARQ process identifiers associated with the second set of TTIs. In some cases, each TTI of the TTIs of the first set of TTIs is associated with a different HARQ process identifier. In some cases, indicating the set of HARQ process identifiers associated with the first set of TTIs includes transmitting a bitmap indicative of the set of HARQ process identifiers associated with the first set of TTIs. In some cases, the bitmap includes a first value at each bit location that corresponds to each HARQ process identifier of the set of HARQ process identifiers associated with the first set of TTIs, and the bitmap includes a second value at each bit location that corresponds to HARQ process identifiers that are unassociated with the first set of TTIs.

Back-off TTI component 1325 may identify a subset of the first set of TTIs that are within a predetermined number of TTIs from the end of a data burst associated with the first set of TTIs. Feedback component 1330 may receive a first ACK message associated with at least one of the TTIs of the subset of TTIs, where the first ACK message indicates that the HARQ processes associated with the at least one TTI of the subset of TTIs was received and not yet decoded and receive a second ACK message associated with the at least one of the TTIs that was associated with the first ACK message, where the second ACK message indicates that the data associated with the HARQ process identifier associated with the at least one TTI was successfully decoded.

System configurations identifier 1335 may indicate in the second downlink control message one or more system configurations associated with the second set of TTIs, where the one or more system configurations associated with the second set of TTIs apply to each TTI of the second set of TTIs, and where at least one of the one or more system configurations associated with the second set of TTIs is different from at least one of the one or more system configurations associated with the first set of TTIs.

Figure 14:
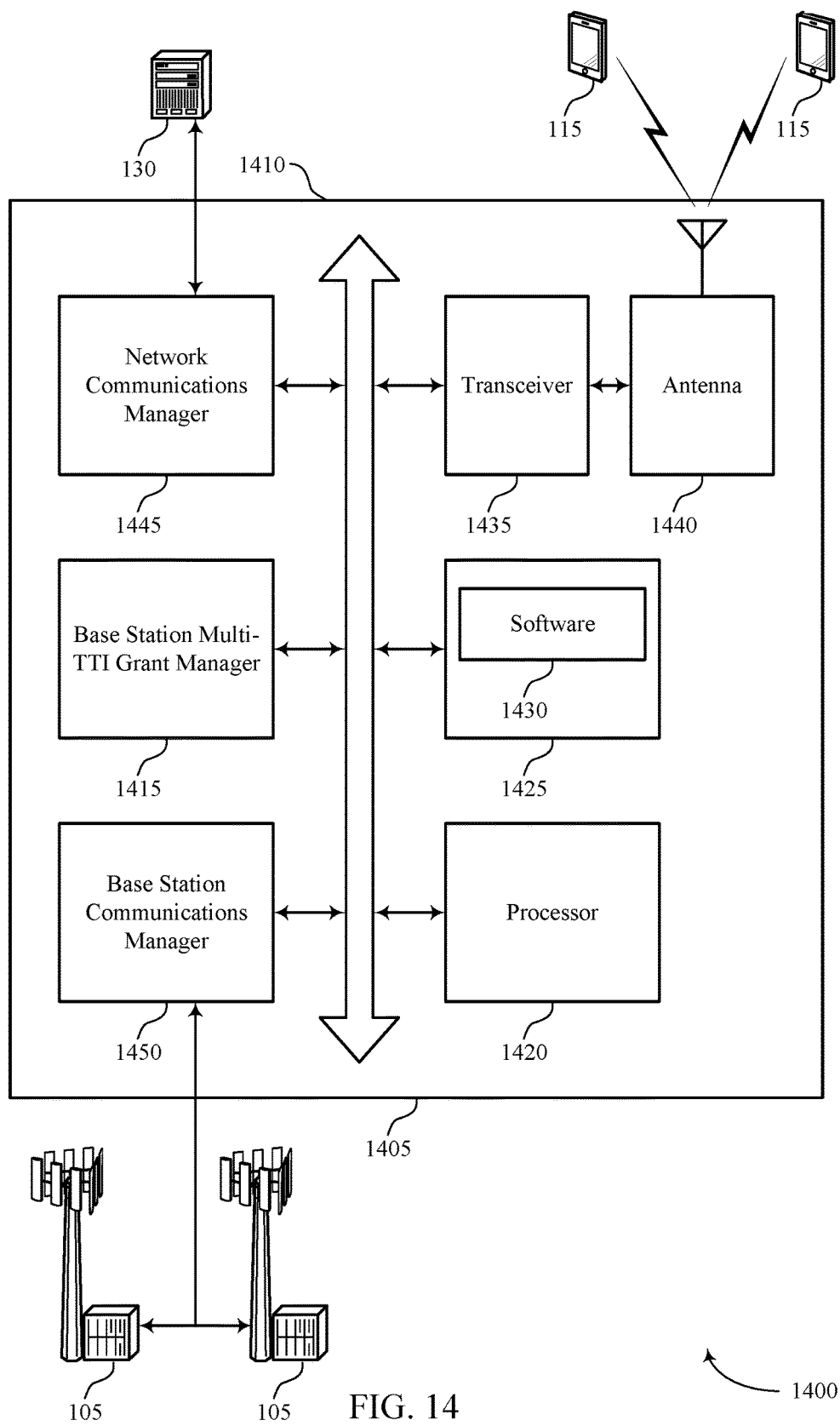
FIG. 14 illustrates a diagram of a system including a device, such as a base station, that supports HARQ feedback and multi-TTI scheduling in accordance with various aspects of the present disclosure.

FIG. 14 shows a diagram of a system 1400 including a device 1405 that supports HARQ feedback and multi-TTI scheduling in accordance with various aspects of the present disclosure. Device 1405 may be an example of or include the components of base station 105 as described above, e.g., with reference to FIG. 1. Device 1405 may include components for bi-directional voice and data communications including components for transmitting and receiving communications, including base station multi-TTI grant manager 1415, processor 1420, memory 1425, software 1430, transceiver 1435, antenna 1440, network communications manager 1445, and base station communications manager 1450. These components may be in electronic communication via one or more busses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting HARQ feedback and multi-TTI scheduling).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware and/or software operation such as the interaction with peripheral components or devices.

Software 1430 may include code to implement aspects of the present disclosure, including code to support HARQ feedback and multi-TTI scheduling. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas. In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Base station communications manager 1450 may manage communications with other base station 105, and may include a controller or scheduler for controlling communications with UEs 115 in cooperation with other base stations 105. For example, the base station communications manager 1450 may coordinate scheduling for transmissions to UEs 115 for various interference mitigation techniques such as beamforming or joint transmission. In some examples, base station communications manager 1450 may provide an X2 interface within an LTE/LTE-A wireless communication network technology to provide communication between base stations 105.

Figure 15:
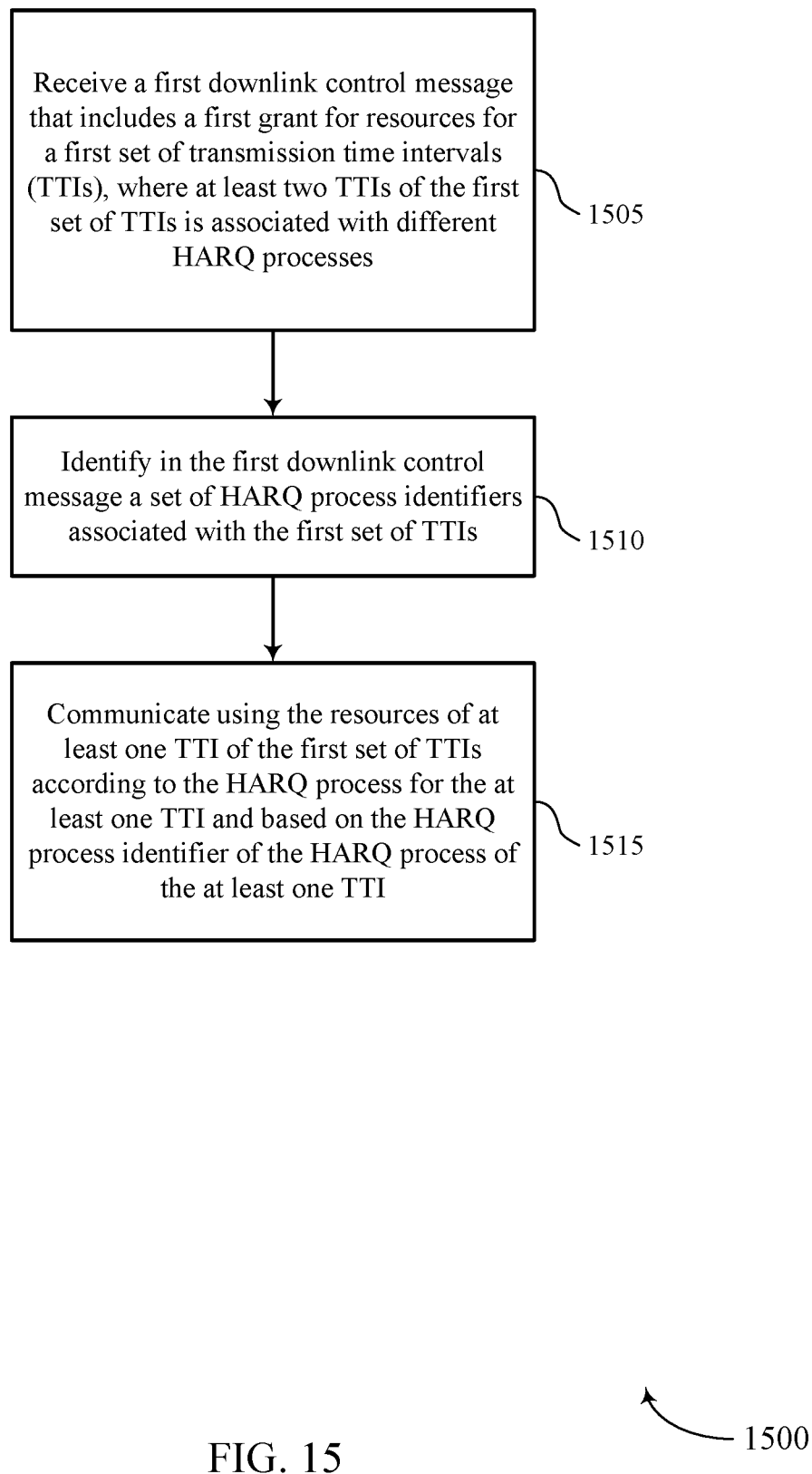
FIGS. 15 through 22 illustrate methods for HARQ feedback and multi-TTI scheduling in accordance with various aspects of the present disclosure.

FIG. 15 shows a flowchart illustrating a method 1500 for HARQ feedback and multi-TTI scheduling in accordance with various aspects of the present disclosure. The operations of method 1500 may be implemented by a UE 115 or its components as described herein. For example, the operations of method 1500 may be performed by a UE multi-TTI grant manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive a first downlink control message that includes a first grant for resources for a first set of TTIs, where at least two TTIs of the first set of TTIs are associated with different HARQ processes. The operations of block 1505 may be performed according to the methods described with reference to FIGS. 1 through 6. In certain examples, aspects of the operations of block 1505 may be performed by a receiver as described with reference to FIGS. 7 through 10.

At block 1510 the UE 115 may identify in the first downlink control message a set of HARQ process identifiers associated with the first set of TTIs. The operations of block 1510 may be performed according to the methods described with reference to FIGS. 1 through 6. In certain examples, aspects of the operations of block 1510 may be performed by a HARQ process identifier as described with reference to FIGS. 7 through 10.

At block 1515 the UE 115 may communicate using the resources of at least one TTI of the first set of TTIs according to the HARQ process for the at least one TTI and based on the HARQ process identifier of the HARQ process of the at least one TTI. The operations of block 1515 may be performed according to the methods described with reference to FIGS. 1 through 6. In certain examples, aspects of the operations of block 1515 may be performed by a transmitter as described with reference to FIGS. 7 through 10.

Figure 16:
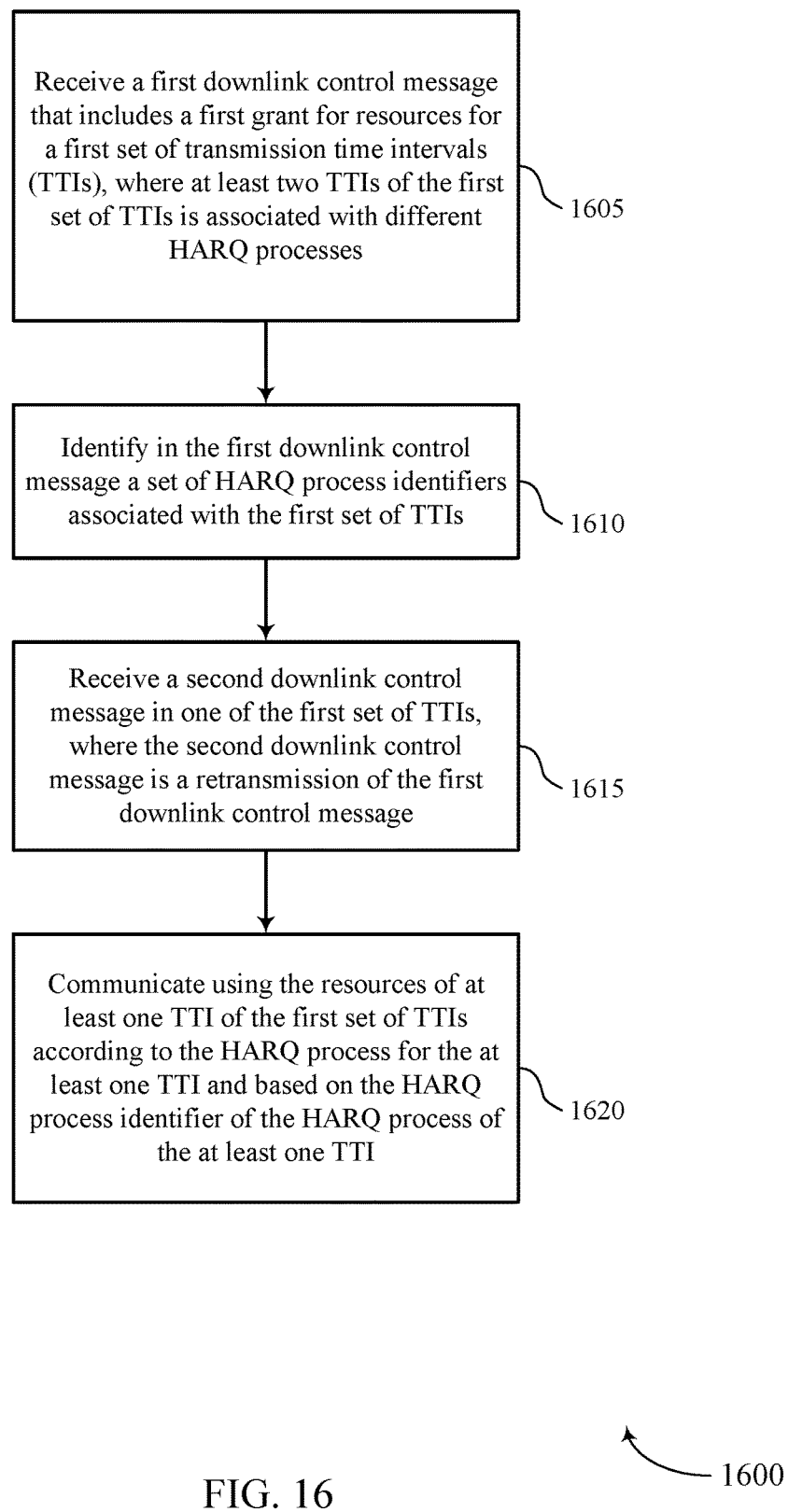

FIG. 16 shows a flowchart illustrating a method 1600 for HARQ feedback and multi-TTI scheduling in accordance with various aspects of the present disclosure. The operations of method 1600 may be implemented by a UE 115 or its components as described herein. For example, the operations of method 1600 may be performed by a UE multi-TTI grant manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive a first downlink control message that includes a first grant for resources for a first set of TTIs, where at least two TTIs of the first set of TTIs are associated with different HARQ processes. The operations of block 1605 may be performed according to the methods described with reference to FIGS. 1 through 6. In certain examples, aspects of the operations of block 1605 may be performed by a receiver as described with reference to FIGS. 7 through 10.

At block 1610 the UE 115 may identify in the first downlink control message a set of HARQ process identifiers associated with the first set of TTIs. The operations of block 1610 may be performed according to the methods described with reference to FIGS. 1 through 6. In certain examples, aspects of the operations of block 1610 may be performed by a HARQ process identifier as described with reference to FIGS. 7 through 10.

At block 1615 the UE 115 may receive a second downlink control message in one of the first set of TTIs, where the second downlink control message is a retransmission of the first downlink control message. The operations of block 1615 may be performed according to the methods described with reference to FIGS. 1 through 6. In certain examples, aspects of the operations of block 1615 may be performed by a receiver as described with reference to FIGS. 7 through 10.

At block 1620 the UE 115 may communicate using the resources of at least one TTI of the first set of TTIs according to the HARQ process for the at least one TTI and based on the HARQ process identifier of the HARQ process of the at least one TTI. The operations of block 1620 may be performed according to the methods described with reference to FIGS. 1 through 6. In certain examples, aspects of the operations of block 1620 may be performed by a transmitter as described with reference to FIGS. 7 through 10.

Figure 17:
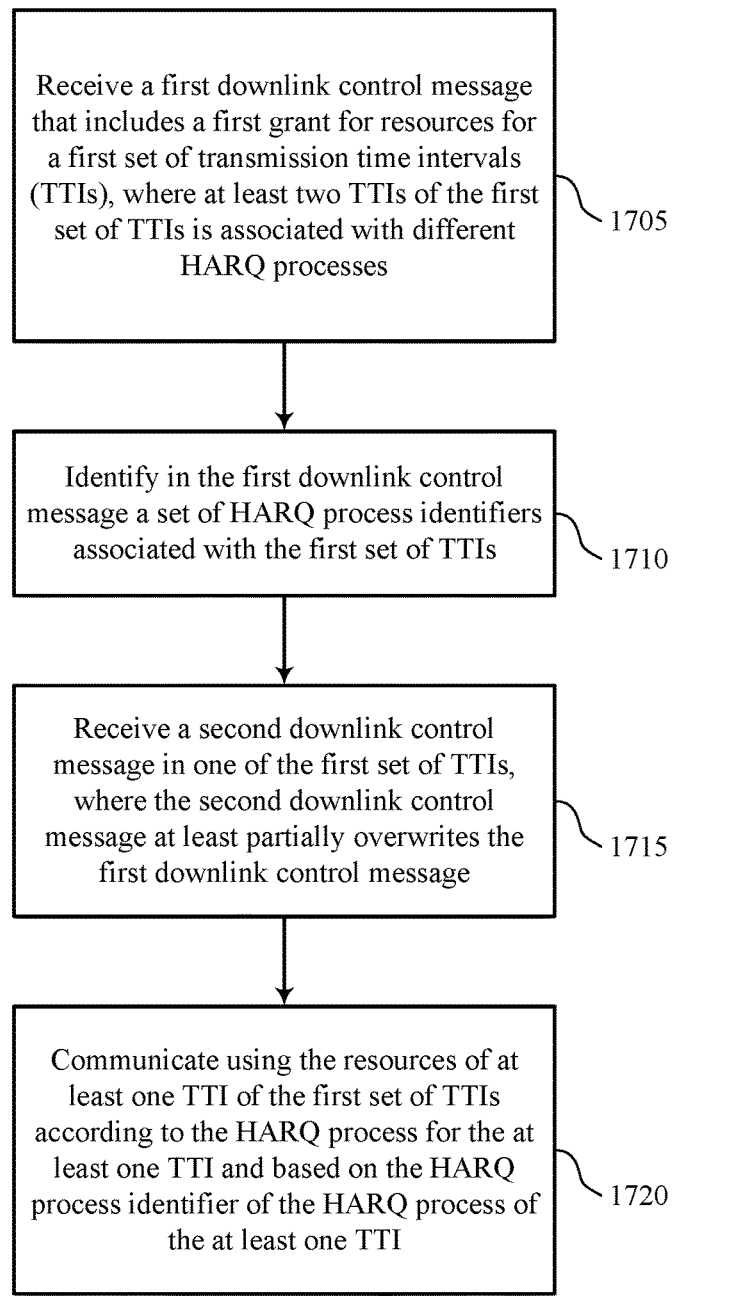

FIG. 17 shows a flowchart illustrating a method 1700 for HARQ feedback and multi-TTI scheduling in accordance with various aspects of the present disclosure. The operations of method 1700 may be implemented by a UE 115 or its components as described herein. For example, the operations of method 1700 may be performed by a UE multi-TTI grant manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may receive a first downlink control message that includes a first grant for resources for a first set of TTIs, where at least two TTIs of the first set of TTIs are associated with different HARQ processes. The operations of block 1705 may be performed according to the methods described with reference to FIGS. 1 through 6. In certain examples, aspects of the operations of block 1705 may be performed by a receiver as described with reference to FIGS. 7 through 10.

At block 1710 the UE 115 may identify in the first downlink control message a set of HARQ process identifiers associated with the first set of TTIs. The operations of block 1710 may be performed according to the methods described with reference to FIGS. 1 through 6. In certain examples, aspects of the operations of block 1710 may be performed by a HARQ process identifier as described with reference to FIGS. 7 through 10.

At block 1715 the UE 115 may receive a second downlink control message in one of the first set of TTIs, where the second downlink control message at least partially overwrites the first downlink control message. The operations of block 1715 may be performed according to the methods described with reference to FIGS. 1 through 6. In certain examples, aspects of the operations of block 1715 may be performed by a receiver as described with reference to FIGS. 7 through 10.

At block 1720 the UE 115 may communicate using the resources of at least one TTI of the first set of TTIs according to the HARQ process for the at least one TTI and based on the HARQ process identifier of the HARQ process of the at least one TTI. The operations of block 1720 may be performed according to the methods described with reference to FIGS. 1 through 6. In certain examples, aspects of the operations of block 1720 may be performed by a transmitter as described with reference to FIGS. 7 through 10.

Figure 18:
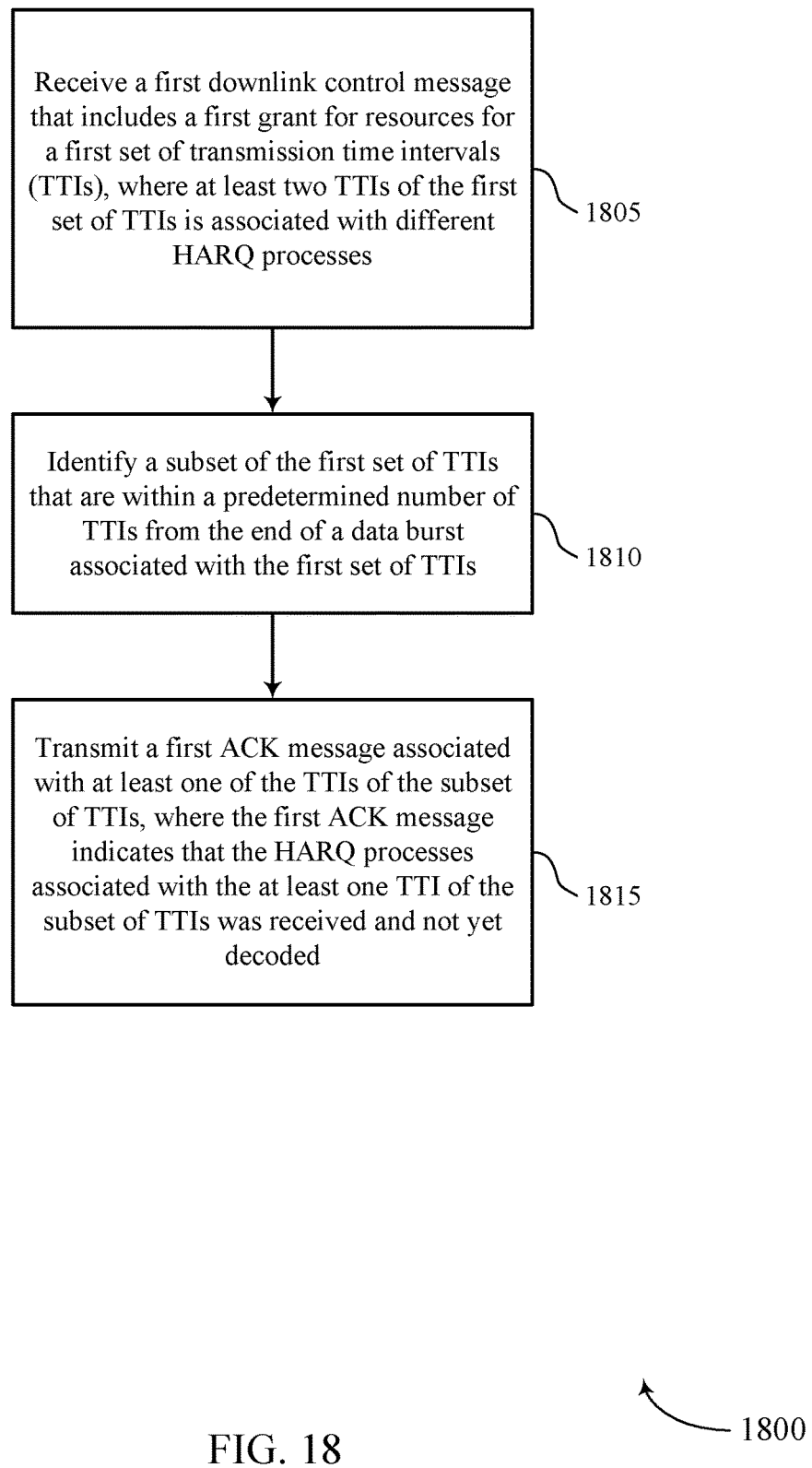

FIG. 18 shows a flowchart illustrating a method 1800 for HARQ feedback and multi-TTI scheduling in accordance with various aspects of the present disclosure. The operations of method 1800 may be implemented by a UE 115 or its components as described herein. For example, the operations of method 1800 may be performed by a UE multi-TTI grant manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may receive a first downlink control message that includes a first grant for resources for a first set of TTIs, where at least two TTIs of the first set of TTIs are associated with different HARQ processes. The operations of block 1805 may be performed according to the methods described with reference to FIGS. 1 through 6. In certain examples, aspects of the operations of block 1805 may be performed by a receiver as described with reference to FIGS. 7 through 10.

At block 1810 the UE 115 may identify a subset of the first set of TTIs that are within a predetermined number of TTIs from the end of a data burst associated with the first set of TTIs. The operations of block 1810 may be performed according to the methods described with reference to FIGS. 1 through 6. In certain examples, aspects of the operations of block 1810 may be performed by a back-off TTI component as described with reference to FIGS. 7 through 10.

At block 1815 the UE 115 may transmit a first ACK message associated with at least one of the TTIs of the subset of TTIs, where the first ACK message indicates that the HARQ processes associated with the at least one TTI of the subset of TTIs was received and not yet decoded. The operations of block 1815 may be performed according to the methods described with reference to FIGS. 1 through 6. In certain examples, aspects of the operations of block 1815 may be performed by a feedback component as described with reference to FIGS. 7 through 10.

Figure 19:
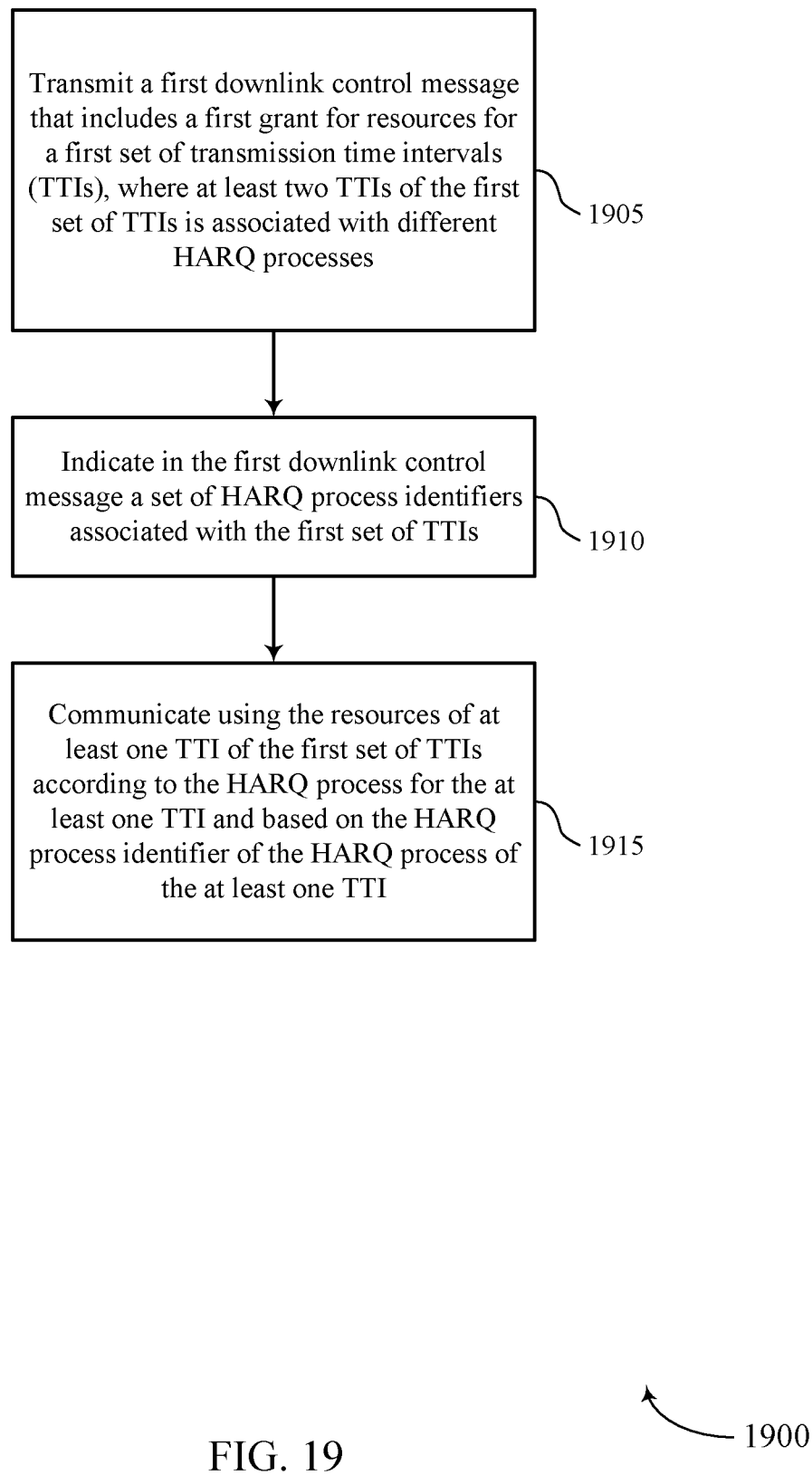

FIG. 19 shows a flowchart illustrating a method 1900 for HARQ feedback and multi-TTI scheduling in accordance with various aspects of the present disclosure. The operations of method 1900 may be implemented by a base station 105 or its components as described herein. For example, the operations of method 1900 may be performed by a base station multi-TTI grant manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 1905 the base station 105 may transmit a first downlink control message that includes a first grant for resources for a first set of TTIs, where at least two TTIs of the first set of TTIs are associated with different HARQ processes. The operations of block 1905 may be performed according to the methods described with reference to FIGS. 1 through 6. In certain examples, aspects of the operations of block 1905 may be performed by a transmitter as described with reference to FIGS. 11 through 14.

At block 1910 the base station 105 may indicate in the first downlink control message a set of HARQ process identifiers associated with the first set of TTIs. The operations of block 1910 may be performed according to the methods described with reference to FIGS. 1 through 6. In certain examples, aspects of the operations of block 1910 may be performed by a HARQ process identifier as described with reference to FIGS. 11 through 14.

At block 1915 the base station 105 may communicate using the resources of at least one TTI of the first set of TTIs according to the HARQ process for the at least one TTI and based on the HARQ process identifier of the HARQ process of the at least one TTI. The operations of block 1915 may be performed according to the methods described with reference to FIGS. 1 through 6. In certain examples, aspects of the operations of block 1915 may be performed by a receiver as described with reference to FIGS. 11 through 14.

Figure 20:
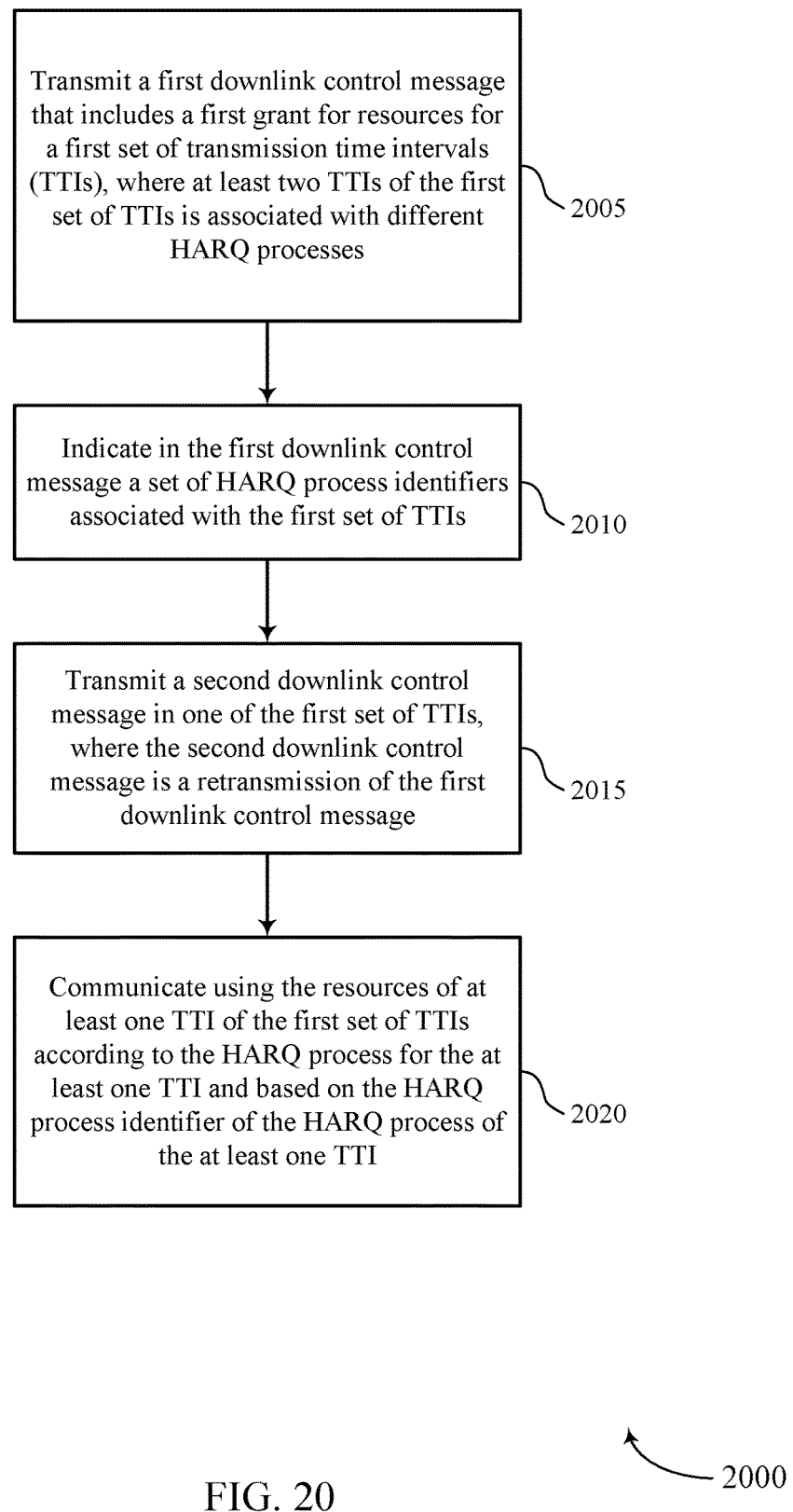

FIG. 20 shows a flowchart illustrating a method 2000 for HARQ feedback and multi-TTI scheduling in accordance with various aspects of the present disclosure. The operations of method 2000 may be implemented by a base station 105 or its components as described herein. For example, the operations of method 2000 may be performed by a base station multi-TTI grant manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 2005 the base station 105 may transmit a first downlink control message that includes a first grant for resources for a first set of TTIs, where at least two TTIs of the first set of TTIs are associated with different HARQ processes. The operations of block 2005 may be performed according to the methods described with reference to FIGS. 1 through 6. In certain examples, aspects of the operations of block 2005 may be performed by a transmitter as described with reference to FIGS. 11 through 14.

At block 2010 the base station 105 may indicate in the first downlink control message a set of HARQ process identifiers associated with the first set of TTIs. The operations of block 2010 may be performed according to the methods described with reference to FIGS. 1 through 6. In certain examples, aspects of the operations of block 2010 may be performed by a HARQ process identifier as described with reference to FIGS. 11 through 14.

At block 2015 the base station 105 may transmit a second downlink control message in one of the first set of TTIs, where the second downlink control message is a retransmission of the first downlink control message. The operations of block 2015 may be performed according to the methods described with reference to FIGS. 1 through 6. In certain examples, aspects of the operations of block 2015 may be performed by a transmitter as described with reference to FIGS. 11 through 14.

At block 2020 the base station 105 may communicate using the resources of at least one TTI of the first set of TTIs according to the HARQ process for the at least one TTI and based on the HARQ process identifier of the HARQ process of the at least one TTI. The operations of block 2020 may be performed according to the methods described with reference to FIGS. 1 through 6. In certain examples, aspects of the operations of block 2020 may be performed by a receiver as described with reference to FIGS. 11 through 14.

Figure 21:
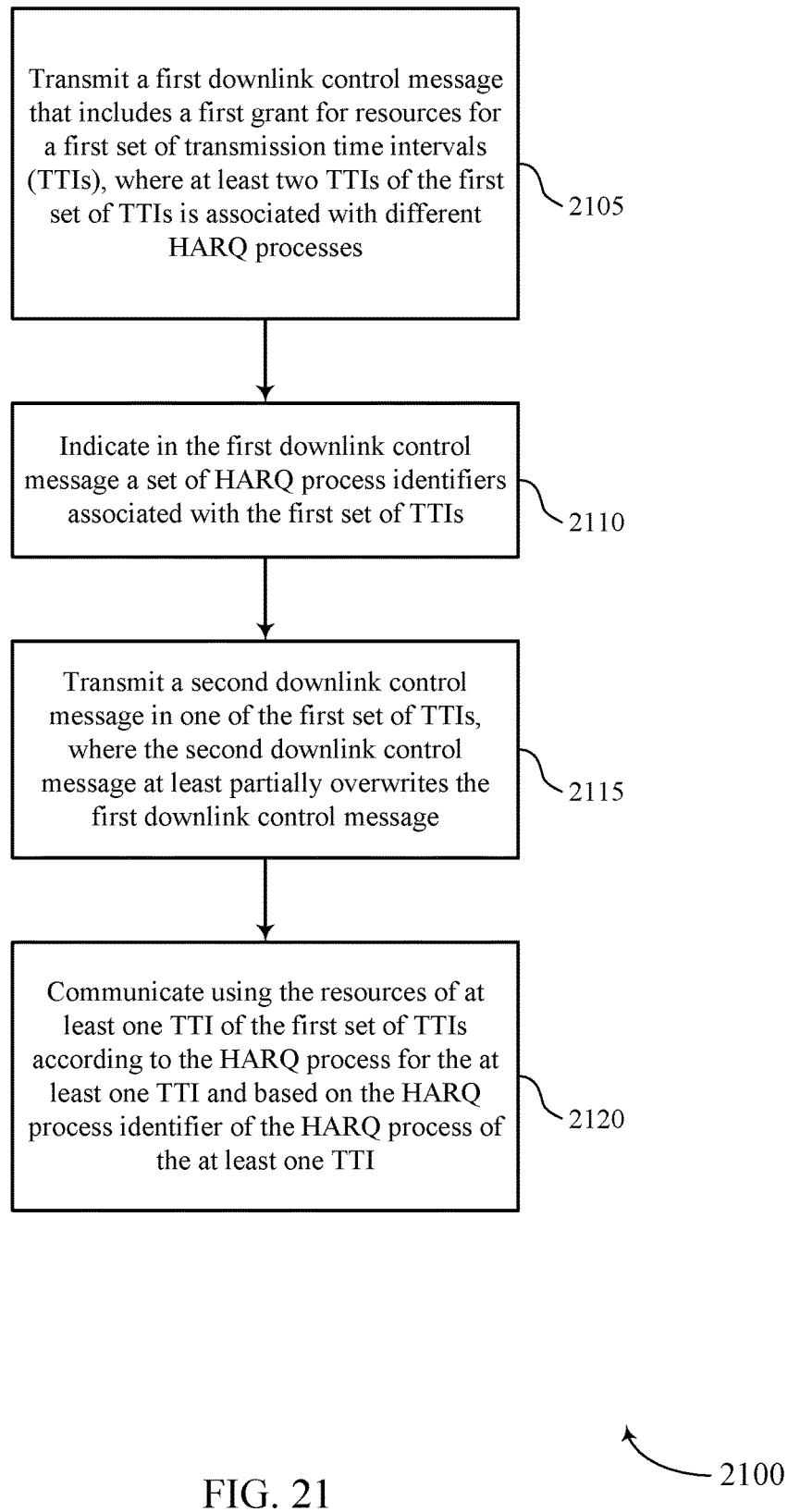

FIG. 21 shows a flowchart illustrating a method 2100 for HARQ feedback and multi-TTI scheduling in accordance with various aspects of the present disclosure. The operations of method 2100 may be implemented by a base station 105 or its components as described herein. For example, the operations of method 2100 may be performed by a base station multi-TTI grant manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 2105 the base station 105 may transmit a first downlink control message that includes a first grant for resources for a first set of TTIs, where at least two TTIs of the first set of TTIs is associated with different HARQ processes. The operations of block 2105 may be performed according to the methods described with reference to FIGS. 1 through 6. In certain examples, aspects of the operations of block 2105 may be performed by a transmitter as described with reference to FIGS. 11 through 14.

At block 2110 the base station 105 may indicate in the first downlink control message a set of HARQ process identifiers associated with the first set of TTIs. The operations of block 2110 may be performed according to the methods described with reference to FIGS. 1 through 6. In certain examples, aspects of the operations of block 2110 may be performed by a HARQ process identifier as described with reference to FIGS. 11 through 14.

At block 2115 the base station 105 may transmit a second downlink control message in one of the first set of TTIs, where the second downlink control message at least partially overwrites the first downlink control message. The operations of block 2115 may be performed according to the methods described with reference to FIGS. 1 through 6. In certain examples, aspects of the operations of block 2115 may be performed by a transmitter as described with reference to FIGS. 11 through 14.

At block 2120 the base station 105 may communicate using the resources of at least one TTI of the first set of TTIs according to the HARQ process for the at least one TTI and based on the HARQ process identifier of the HARQ process of the at least one TTI. The operations of block 2120 may be performed according to the methods described with reference to FIGS. 1 through 6. In certain examples, aspects of the operations of block 2120 may be performed by a receiver as described with reference to FIGS. 11 through 14.

Figure 22:
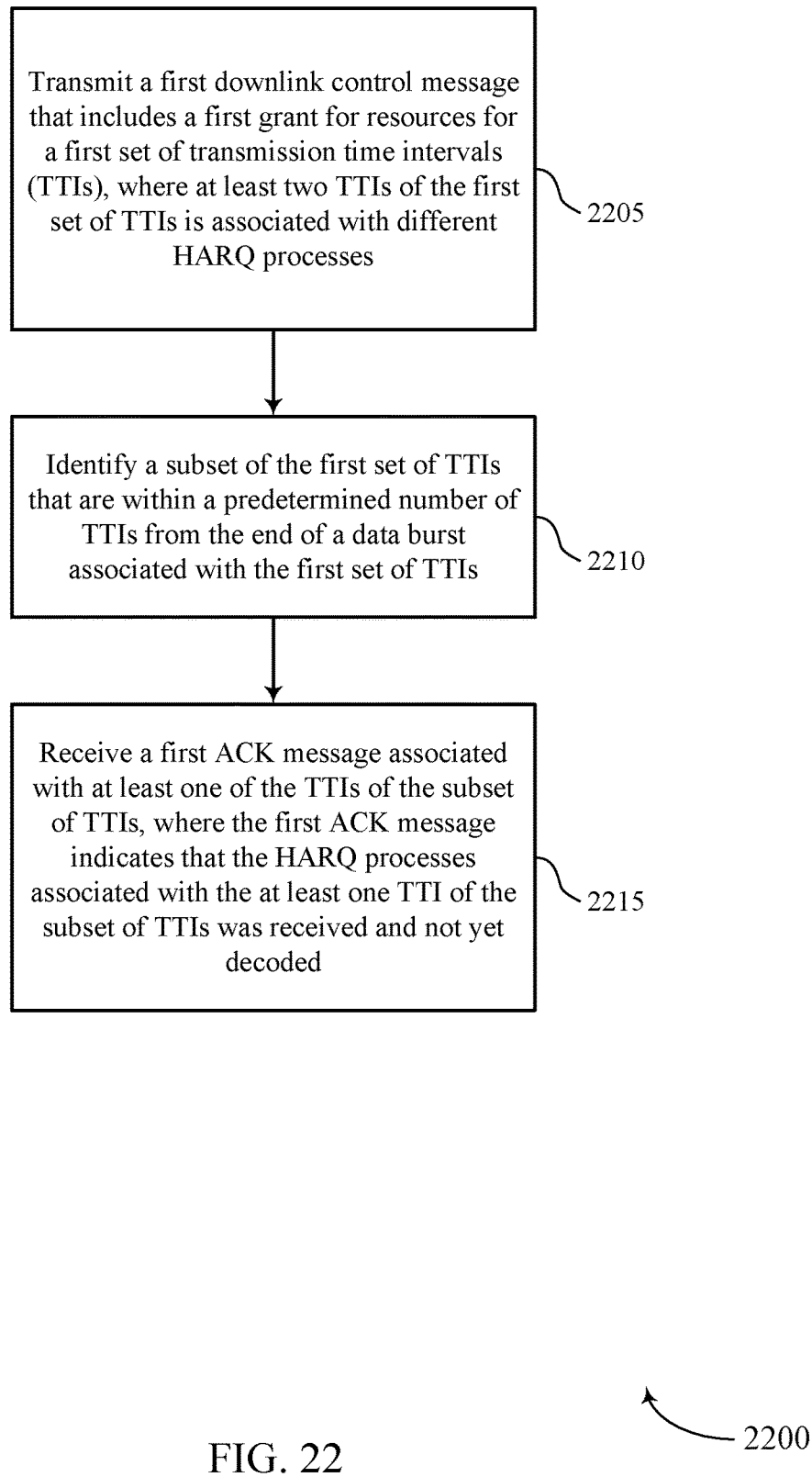

FIG. 22 shows a flowchart illustrating a method 2200 for HARQ feedback and multi-TTI scheduling in accordance with various aspects of the present disclosure. The operations of method 2200 may be implemented by a base station 105 or its components as described herein. For example, the operations of method 2200 may be performed by a base station multi-TTI grant manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 2205 the base station 105 may transmit a first downlink control message that includes a first grant for resources for a first set of TTIs, where at least two TTIs of the first set of TTIs are associated with different HARQ processes. The operations of block 2205 may be performed according to the methods described with reference to FIGS. 1 through 6. In certain examples, aspects of the operations of block 2205 may be performed by a transmitter as described with reference to FIGS. 11 through 14.

At block 2210 the base station 105 may identify a subset of the first set of TTIs that are within a predetermined number of TTIs from the end of a data burst associated with the first set of TTIs. The operations of block 2210 may be performed according to the methods described with reference to FIGS. 1 through 6. In certain examples, aspects of the operations of block 2210 may be performed by a back-off TTI component as described with reference to FIGS. 11 through 14.

At block 2215 the base station 105 may receive a first ACK message associated with at least one of the TTIs of the subset of TTIs, where the first ACK message indicates that the HARQ processes associated with the at least one TTI of the subset of TTIs was received and not yet decoded. The operations of block 2215 may be performed according to the methods described with reference to FIGS. 1 through 6. In certain examples, aspects of the operations of block 2215 may be performed by a feedback component as described with reference to FIGS. 11 through 14.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving a first downlink control message that includes a first grant for resources for a first plurality of transmission time intervals (TTIs), wherein at least two TTIs of the first plurality of TTIs are associated with different hybrid automatic repeat request (HARQ) processes;
   determining a total number of the first plurality of TTIs in the first grant for the resources based at least in part on a number of occurrences of a first value included in a bitmap received in the first downlink control message;
   identifying, based at least in part on the bitmap, a plurality of HARQ process identifiers corresponding to the first plurality of TTIs in the first grant, wherein each of the occurrences of the first value included in the bitmap corresponds to a respective HARQ process identifier of the plurality of HARQ process identifiers; and
   communicating using the resources of at least one TTI of the first plurality of TTIs according to a HARQ process for the at least one TTI and based at least in part on a HARQ process identifier of the HARQ process for the at least one TTI.

2. The method of claim 1, wherein each TTI of the TTIs of the first plurality of TTIs is associated with a different HARQ process identifier.

3. The method of claim 1, wherein identifying the plurality of HARQ process identifiers associated with the first plurality of TTIs comprises:
   identifying the bitmap, wherein the bitmap is indicative of the plurality of HARQ process identifiers associated with the first plurality of TTIs.

4. The method of claim 3, wherein the bitmap comprises the first value at each bit location that corresponds to each HARQ process identifier of the plurality of HARQ process identifiers associated with the first plurality of TTIs, and the bitmap comprises a second value at each bit location that corresponds to HARQ process identifiers that are unassociated with the first plurality of TTIs.

5. The method of claim 1, further comprising:
   identifying in the first downlink control message one or more system configurations associated with the first plurality of TTIs, wherein the one or more system configurations apply to each TTI of the first plurality of TTIs.

6. The method of claim 5, wherein the one or more system configurations associated with the first plurality of TTIs comprise a modulation and coding scheme (MCS), a rank, a resource block (RB) allocation, or any combination thereof.

7. The method of claim 1, further comprising:
   identifying in the first downlink control message a new data identifier (NDI) associated with the first plurality of TTIs.

8. The method of claim 7, further comprising:
   identifying the NDI associated with the first plurality of TTIs comprises decoding an NDI bitmap.

9. The method of claim 8, wherein the NDI bitmap comprises a length that is equal to a total number of the first plurality of TTIs.

10. The method of claim 8, wherein the NDI bitmap comprises a length that is based at least in part on a maximum transmission opportunity of a data burst associated with the first plurality of TTIs.

11. The method of claim 8, wherein the NDI bitmap comprises a length that is equal to a length of the bitmap, wherein the bitmap is indicative of the plurality of HARQ process identifiers associated with the first plurality of TTIs.

12. The method of claim 1, further comprising:
   determining a transmission order for the plurality of HARQ process identifiers.

13. The method of claim 12, further comprising:
   determining the transmission order for the plurality of HARQ process identifiers comprises ordering the plurality of HARQ process identifiers in numerically ascending order, numerically descending order, or any other deterministic order.

14. The method of claim 12, further comprising:
determining the transmission order for the plurality of HARQ process identifiers comprises ordering HARQ process identifiers associated with new data transmissions before or after HARQ process identifiers associated with retransmissions.

15. The method of claim 1, further comprising:
receiving a second downlink control message subsequent to the first plurality of TTIs, the second downlink control message comprising a second grant for resources for a second plurality of TTIs; and
identifying in the second downlink control message a plurality of HARQ process identifiers associated with the second plurality of TTIs.

16. The method of claim 15, wherein the plurality of HARQ process identifiers associated with the second plurality of TTIs are different from the plurality of HARQ process identifiers associated with the first plurality of TTIs.

17. The method of claim 15, wherein the plurality of HARQ process identifiers associated with the second plurality of TTIs are the same as the plurality of HARQ process identifiers associated with the first plurality of TTIs.

18. The method of claim 15, further comprising:
identifying in the second downlink control message one or more system configurations associated with the second plurality of TTIs, wherein the one or more system configurations associated with the second plurality of TTIs apply to each TTI of the second plurality of TTIs, and wherein at least one of the one or more system configurations associated with the second plurality of TTIs is different from at least one of one or more system configurations associated with the first plurality of TTIs.

19. The method of claim 18, wherein the one or more system configurations associated with the first plurality of TTIs and the one or more system configurations associated with the second plurality of TTIs comprise a modulation and coding scheme (MCS), a rank, a resource block (RB) allocation, or any combination thereof.

20. The method of claim 1, further comprising:
receiving a second downlink control message in one of the first plurality of TTIs, wherein the second downlink control message is a retransmission of the first downlink control message.

21. The method of claim 20, further comprising:
decoding from the second downlink control message a bitmap that identifies a subset of the plurality of HARQ process identifiers that are associated with the one of the first plurality of TTIs that the second downlink control message was received in and subsequent TTIs of the first plurality of TTIs.

22. The method of claim 20, further comprising:
identifying in the first downlink control message one or more system configurations associated with the first plurality of TTIs; and
identifying in the second downlink control message one or more system configurations associated with the first plurality of TTIs, wherein the one or more system configurations identified in the first downlink control message are the same as the one or more system configurations identified in the second downlink control message.

23. The method of claim 1, further comprising:
receiving a second downlink control message in one of the first plurality of TTIs, wherein the second downlink control message at least partially overwrites the first downlink control message.

24. The method of claim 23, further comprising:
identifying in the first downlink control message one or more system configurations associated with the first plurality of TTIs; and
identifying in the second downlink control message one or more system configurations associated with the first plurality of TTIs, wherein at least one of the one or more system configurations identified in the first downlink control message is different than at least one of the one or more system configurations identified in the second downlink control message.

25. The method of claim 1, wherein the first grant for resources comprises an assignment of uplink resources.

26. The method of claim 25, further comprising:
performing a clear channel assessment (CCA);
encoding data for transmission on uplink resources; and
transmitting a portion of the data on the uplink resources, wherein the portion of the data transmitted on the uplink resources is based at least in part on a duration of a delay associated with the CCA.

27. An apparatus for wireless communication, comprising:
means for receiving a first downlink control message that includes a first grant for resources for a first plurality of transmission time intervals (TTIs), wherein at least two TTIs of the first plurality of TTIs are associated with different hybrid automatic repeat request (HARQ) processes;
means for determining a total number of the first plurality of TTIs in the first grant for the resources based at least in part on a number of occurrences of a first value included in a bitmap received in the first downlink control message;
means for identifying, based at least in part on the bitmap, a plurality of HARQ process identifiers corresponding to the first plurality of TTIs in the first grant, wherein each of the occurrences of the first value included in the bitmap corresponds to a respective HARQ process identifier of the plurality of HARQ process identifiers; and
means for communicating using the resources of at least one TTI of the first plurality of TTIs according to a HARQ process for the at least one TTI and based at least in part on a HARQ process identifier of the HARQ process for the at least one TTI.

28. An apparatus for wireless communication, in a system comprising:
a processor;
memory in electronic communication with the processor; and
instructions stored in the memory and operable, when executed by the processor, to cause the apparatus to:
receive a first downlink control message that includes a first grant for resources for a first plurality of transmission time intervals (TTIs), wherein at least two TTIs of the first plurality of TTIs are associated with different hybrid automatic repeat request (HARQ) processes;
determine a total number of the first plurality of TTIs in the first grant for the resources based at least in part on a number of occurrences of a first value included in a bitmap received in the first downlink control message;

identify, based at least in part on the bitmap, a plurality of HARQ process identifiers corresponding to the first plurality of TTIs in the first grant, wherein each of the occurrences of the first value included in the bitmap corresponds to a respective HARQ process identifier of the plurality of HARQ process identifiers; and communicate using the resources of at least one TTI of the first plurality of TTIs according to a HARQ process for the at least one TTI and based at least in part on a HARQ process identifier of the HARQ process for the at least one TTI.

29. A non-transitory computer readable medium storing code for wireless communication, the code comprising instructions executable to:

receive a first downlink control message that includes a first grant for resources for a first plurality of transmission time intervals (TTIs), wherein at least two TTIs of the first plurality of TTIs are associated with different hybrid automatic repeat request (HARQ) processes;

determine a total number of the first plurality of TTIs in the first grant for the resources based at least in part on a number of occurrences of a first value included in a bitmap received in the first downlink control message;

identify, based at least in part on the bitmap, a plurality of HARQ process identifiers corresponding to the first plurality of TTIs in the first grant, wherein each of the occurrences of the first value included in the bitmap corresponds to a respective HARQ process identifier of the plurality of HARQ process identifiers; and communicate using the resources of at least one TTI of the first plurality of TTIs according to a HARQ process for the at least one TTI and based at least in part on a HARQ process identifier of the HARQ process for the at least one TTI.

* * * * *